United States Patent
Inubushi et al.

(10) Patent No.: US 10,354,560 B2
(45) Date of Patent: *Jul. 16, 2019

(54) MULTILAYER LABEL, CONTAINER INCLUDING THE SAME, AND METHOD FOR PRODUCING CONTAINER

(71) Applicant: KURARAY CO., LTD., Kurashiki-shi (JP)

(72) Inventors: Yasutaka Inubushi, Kurashiki (JP); Ryoichi Sasaki, Kurashiki (JP); Masakazu Nakaya, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 37 days.

This patent is subject to a terminal disclaimer.

(21) Appl. No.: 15/502,937

(22) PCT Filed: Jul. 1, 2015

(86) PCT No.: PCT/JP2015/003322
§ 371 (c)(1),
(2) Date: Feb. 9, 2017

(87) PCT Pub. No.: WO2016/024380
PCT Pub. Date: Feb. 18, 2016

(65) Prior Publication Data
US 2017/0229047 A1 Aug. 10, 2017

(30) Foreign Application Priority Data
Aug. 13, 2014 (JP) .................................. 2014-164644

(51) Int. Cl.
| G09F 3/00 | (2006.01) |
| G09F 3/04 | (2006.01) |
| B65D 1/26 | (2006.01) |
| B65D 1/28 | (2006.01) |
| B32B 9/00 | (2006.01) |
| B29C 45/14 | (2006.01) |
| B65D 25/20 | (2006.01) |
| C08J 7/04 | (2006.01) |
| B29K 105/00 | (2006.01) |
| B29L 31/00 | (2006.01) |
| G09F 3/02 | (2006.01) |

(52) U.S. Cl.
CPC .............. *G09F 3/04* (2013.01); *B29C 45/14* (2013.01); *B32B 9/00* (2013.01); *B65D 1/26* (2013.01); *B65D 1/28* (2013.01); *B65D 25/205* (2013.01); *C08J 7/045* (2013.01); *G09F 3/00* (2013.01); *B29C 45/14811* (2013.01); *B29C 2045/14918* (2013.01); *B29K 2105/0067* (2013.01); *B29L 2031/712* (2013.01); *C08J 2367/02* (2013.01); *C08J 2433/04* (2013.01); *C08J 2443/02* (2013.01); *G09F 2003/0255* (2013.01); *G09F 2003/0257* (2013.01); *G09F 2003/0272* (2013.01)

(58) Field of Classification Search
None
See application file for complete search history.

(56) References Cited

U.S. PATENT DOCUMENTS

| 4,689,272 A * | 8/1987 | Simon .................... B41N 3/038 |
| | | 205/139 |
| 2013/0034674 A1* | 2/2013 | Yoshida ............... C09D 123/02 |
| | | 428/35.2 |
| 2015/0050480 A1 | 2/2015 | Suzuki et al. |
| 2017/0129216 A1 | 5/2017 | Shimizu et al. |

FOREIGN PATENT DOCUMENTS

| EP | 3 165 359 A1 | 5/2017 |
| JP | 8-132477 A | 5/1996 |
| JP | 2002-251138 A | 9/2002 |
| JP | 2013-202973 A | 10/2013 |
| JP | 2013-208793 A | 10/2013 |
| JP | 2013-208794 A | 10/2013 |

OTHER PUBLICATIONS

International Search Report dated Sep. 29, 2015 in PCT/JP2015/003322 Filed Jul. 1, 2015.
Extended European Search Report dated Mar. 6, 2018 in corresponding European Patent Application No. 15831446.8, 7 pages.

* cited by examiner

*Primary Examiner* — Sheeba Ahmed
(74) *Attorney, Agent, or Firm* — Oblon, McClelland, Maier & Neustadt, L.L.P.

(57) ABSTRACT

The present invention provides a multilayer label having good gas barrier properties and is capable of maintaining the gas barrier properties at a high level even when exposed to physical stresses such as deformation and impart. The present invention relates to a multilayer label for in-mold labeling. This multilayer label includes a base (X), a layer (Z) containing an aluminum atom, and a layer (Y) containing a polymer (A) having a functional group containing a phosphorus atom.

8 Claims, 2 Drawing Sheets

MULTILAYER LABEL, CONTAINER INCLUDING THE SAME, AND METHOD FOR PRODUCING CONTAINER

TECHNICAL FIELD

The present invention relates to a multilayer label having gas barrier properties, a container including the multilayer label, and a method for producing the container.

BACKGROUND ART

Plastic containers are widely used as packaging containers in various fields, for example, in the fields of food and medical products because of their various advantageous characteristics such as ease of molding, light weight, and low cost. Such plastic containers, however, suffer from various problems. For example, plastic containers allow permeation of low molecular gases such as oxygen, carbon dioxide, and water vapor and allow adsorption of low molecular organic compounds onto their inner surfaces. Various attempts have been made to solve these problems. For example, as an attempt to reduce the gas permeability of a plastic container, a technique of stacking an ethylene-vinyl alcohol copolymer resin layer having gas barrier properties on a matrix resin layer made of a polyolefin resin is employed. As another example of such an attempt, a technique of using a resin blend of a polyolefin resin and a gas barrier resin is employed.

Ethylene-vinyl alcohol copolymers have drawbacks such as very poor gas barrier properties under high humidity conditions, although they exhibit relatively good oxygen barrier properties under dry conditions. In addition, the use of these resins can reduce the gas permeability to some extent but if not sufficient to achieve better gas barrier properties required.

In-mold labeling is well known as a technique for improving the gas barrier properties of containers. In in-mold labeling, a label with a heat seal layer is set in a mold before blow molding or injection molding. The heat seal layer of the label is fused to the surface of a molded body by the heat of a resin used for the molding of the body, and thus labeling is performed simultaneously with the molding.

Patent Literature 1 discloses an in-mold labeled container and a production method thereof. Patent Literature 1 discloses a method for performing in-mold labeling using a label including a barrier layer composed of a metal foil layer or a thermoplastic resin layer. Patent Literature 1 also discloses a polyethylene terephthalate film including deposited silicon oxide as a gas barrier layer.

However, in such a conventional in-mold label, a gas barrier layer may suffer from defects such as cracks and pinholes when exposed to physical stresses such as deformation and impact. Therefore, the gas barrier properties may be insufficient when used in practice. For example, when an in-mold labeled container is used as a food packaging material, it is exposed to physical stresses of varying magnitude in the processes of food filling, transportation, displaying, and consumption. In addition, the barrier properties of the container may be reduced due to thermal contraction by heating during in-mold labeling. There has thus been a demand for an in-mold label capable of maintaining good gas barrier properties even when exposed to physical stresses.

CITATION LIST

Patent Literature

Patent Literature 1: JP 08-132477 A

SUMMARY OF INVENTION

Technical Problem

Under these circumstances, an object of the present invention is to provide: a multilayer label that has good gas barrier properties and is capable of maintaining the gas barrier properties at a high level even when exposed to physical stresses such as deformation and impact; a container including the multilayer label; and a method for producing the container. Another object of the present invention is to provide: a multilayer label that has good properties such as high resistance to appearance defects such as interlayer delamination when heated during in-mold labeling; and a container including the multilayer label.

Solution to Problem

Through a detailed study, the present inventors have found that the above objects can be achieved by using, as a multilayer label, a multilayer structure including a base (X), a layer (Z) containing an aluminum atom, and a layer (Y) containing a polymer (A) having a functional group containing a phosphorus atom, and have completed the present invention.

The present invention provides a multilayer label. This multilayer label is a multilayer label for in-mold labeling, and includes a base (X), a layer (Z) containing an aluminum atom, and a layer (Y) containing a polymer (A) having a functional group containing a phosphorus atom.

The multilayer label of the present invention may include at least one pair of the layer (Z) and the layer (Y) that are disposed contiguous to each other.

In the multilayer label of the present invention, the layer (Z) may include a layer (Z1) containing a reaction product (E). The reaction product (E) is a reaction product formed by a reaction between a metal oxide (C) containing an aluminum atom and a phosphorus compound (D). In an infrared absorption spectrum of the layer (Z1), a maximum absorption wavenumber in a region of 800 to 1,400 $cm^{-1}$ is 1,080 to 1,130 $cm^{-1}$.

In the multilayer label of the present invention, the layer (Z) may include a deposited layer (Z2) of aluminum or a deposited layer (Z3) of aluminum oxide.

In the multilayer label of the present invention, the polymer (A) may be a polymer (Aa) having at least one functional group selected from the group consisting of a phosphoric acid group, a phosphorous acid group, a phosphonic acid group, a phosphonous acid group, a phosphinic acid group, and a phosphinous acid group.

In the multilayer label of the present invention, the base (X) may include at least one selected from the group consisting of a thermoplastic resin film layer and a paper layer.

The multilayer label of the present invention may have an oxygen transmission rate of 2 mL/($m^2$·day·atm) or less at 20° C. and 85% RH.

The present invention provides a container. This container includes the multilayer label of the present invention laminated thereon.

The present invention provides a method for producing the container of the present invention. This production method included a first step of placing the multilayer label of the present invention in a cavity between a female mold member and a male mold member; and a second step of injecting a molten resin into the cavity to perform molding of a container body and lamination of the multilayer label to the container body simultaneously.

Advantageous Effects of Invention

According to the present invention, it is possible to obtain a multilayer label that has good gas barrier properties and is capable of maintaining the gas barrier properties at a high level even when exposed lo physical stresses such as deformation and impact. With the use of this multilayer label, it is possible to obtain a container that has good properties such as high resistance to appearance defects such as interlayer domination when heated during in-mold labeling.

DESCRIPTION OF EMBODIMENTS

Figure 1:
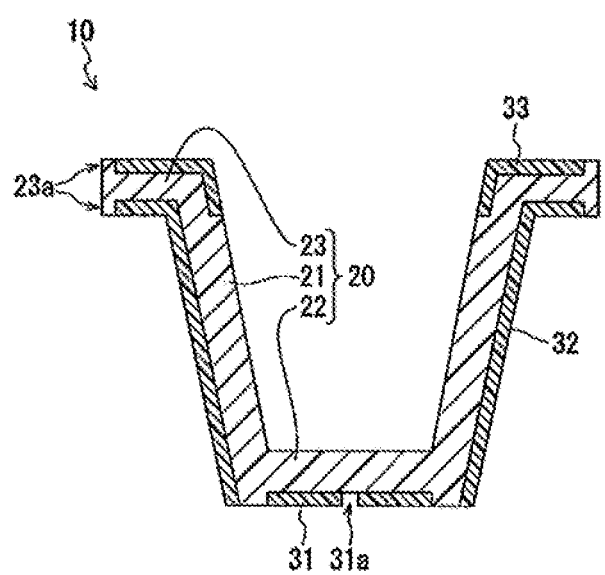
FIG. 1 is a cross-sectional view schematically showing an example of a container of the present invention.

Hereinafter, the present invention will be described with reference to examples. The following description gives examples of materials, conditions, techniques, and value ranges; however, the present invention is not limited to those mentioned as examples. The materials given as examples may be used alone or may be used in combination with one another, unless otherwise specified.

Unless otherwise specified, the meaning of an expression like "a particular layer is stacked on a particular member (such as a base or layer)" as used herein encompasses not only the case where the particular layer is stacked in direct contact with the member but also the case where the particular layer is stacked above the member, with another layer interposed therebetween. The same applies to expressions like "a particular layer is formed on a particular member (such as a base or layer)" and "a particular layer is disposed on a particular member (such as a base or layer)". Unless otherwise specified, the meaning of an expression like "a liquid (such as a coating liquid) is applied onto a particular member (such as a base or layer)" encompasses not only the case where the liquid is applied directly to the member but also the case where the liquid is applied to another layer formed on the member.

Herein, a layer may be termed "layer (Y)" using a reference character "(Y)" to differentiate the layer from other layers. The reference character "(Y)" has no technical meaning, unless otherwise specified. The same applies to other reference characters used in the terms such as "base (X)", "layer (Z)", and "metal oxide (C)". However, an exception is made for the terms such as "hydrogen atom (H)" in which the reference character obviously represents a specific element.

[Multilayer Label (In-mold Label)]

The multilayer label of the present invention is a multilayer label for in-mold labeling. This multilayer label includes a base (X), a layer (Z) containing an aluminum atom, and a layer (Y) containing a polymer (A) having a functional group containing a phosphorus atom. The base (X), the layer (Z), and the layer (Y) will be described later.

An in-mold label is exposed to deformation due to thermal contraction of the base (X) during in-mold labeling or to impact during distribution and/or in use. The multilayer label of the present invention is capable of maintaining the gas barrier properties at a high level even when exposed to such physical stresses. This mechanism has not yet been elucidated, but perhaps the presence of the layer (Y) may reduce stresses applied to the layer (Z). However, regardless of whether this mechanism works or not, multilayer labels that meet the requirements of the present invention are included in the technical scope of the present invention. A structure made up of the layer (Y) and layer (Z) stacked contiguously may hereinafter be referred to as a "layer (YZ)". Furthermore, a multilayer film including the base (X) and the layer (YZ) stacked on the base (X) may hereinafter be referred to as a "multilayer barrier film". This multilayer barrier film also is a type of the multilayer structure of the present invention.

A method commonly used to produce packaging materials may be used to produce a multilayer label. Examples of the method include: co-extrusion processes (such as co-extrusion film molding, co-extrusion sheet molding, and co-extrusion inflation molding); and lamination processes (such as extrusion lamination, sandwich lamination, co-extrusion lamination, dry lamination, and solvent-free dry lamination). Layers to be included in the multilayer label can easily be formed by any of these methods.

The melt temperature in the extrusion step in the production of the multilayer label can be determined as appropriate depending on the melting point of a resin used, and is preferably 120 to 330° C., and more preferably 150 to 300° C.

The thickness of the multilayer label is not particularly limited. The thickness is preferably in the range of 50 to 500 µm, and more preferably in the range of 70 to 350 µm. The total thickness of layers other than the base (X) and the layer (YZ) is preferably in the range of 20 to 150 µm, and more preferably in the range of 80 to 120 µm. The thickness of each layer can be measured by observing a cross-section of the multilayer label with a scanning electron microscope or transmission electron microscope.

[Multilayer Structure (Multilayer Label)]

Hereinafter, a multilayer structure that may be used as the multilayer label of the present invention will be described. In the following description, the term "multilayer structure" is interchangeable with the term "multilayer label".

As described above, the multilayer structure (multilayer label) of the present invention includes a base (X), a layer (Z) containing an aluminum atom, and a layer (Y) containing a polymer (A) having a functional group containing a phosphorus atom. The term "multilayer structure" as used in the following description refers to a multilayer structure that includes the base (X), the layer (Z), and the layer (Y), unless otherwise specified.

In the layer (Y), at least a portion of the polymer (A) and at least a portion of the polymer (B) may have undergone a reaction. When the polymer (A) has undergone a reaction in the layer (Y), a moiety derived from the polymer (A) in the reaction product is regarded as the polymer (A). In this case, the mass of the polymer (A) used in the formation of the reaction product (the mass of the polymer (A) that has yet to undergo the reaction) is included in the mass of the polymer (A) in the layer (Y). When the polymer (B) has undergone a reaction in the layer (Y), a moiety derived from the polymer (B) in the reaction product is regarded as the polymer (B). In this case, the mass of the polymer (B) used in the formation of the reaction product (the mass of the polymer (B) that has yet to undergo the reaction) is included in the mass of the polymer (B) in the layer (Y).

The polymer (B) typically contains no phosphorus atoms. More specifically, the polymer (B) does not contain the functional group (phosphorus atom-containing functional group) described later. A compound possessing the features of both the polymer (A) and the polymer (B) is regarded as the polymer (A) in the calculation of the mass ratio.

In the layer (Y), the mass ratio between the polymer (A) and the polymer (B) may be in the range of 20:80 to 99:1, in the range of 60:40 to 99:1, or In the range of 70:30 to 91:9. The base (X) and the layer (Y) will hereinafter be described.

[Base (X)]

The material of the base (X) is not particularly limited, and a base made of any of various materials can be used. Examples of the material of the base (X) include: resins such as thermoplastic resins and thermosetting resins; and fiber assemblies such as paper. Among these, thermoplastic resins and paper are preferred. The base (X) in a preferred example includes at least one selected from the group consisting of a thermoplastic resin film layer and a paper layer. The base (X) may be a composite made of a plurality of materials and may be a single-layer or multilayer base. The form of the base (X) is not particularly limited. The base (X) may be a laminar base such as a film or sheet.

Examples of thermoplastic resins that may be used in the base (X) include: polyolefin resins such as polyethylene and polypropylene; polyester resins such as polyethylene terephthalate, polyethylene-2,6-naphthalate, polybutylene terephthalate, and copolymers thereof polyamide resins such as nylon-6, nylon-66, and nylon-12; hydroxy group-containing polymers such as polyvinyl alcohol and ethylene-vinyl alcohol copolymer; polystyrene; poly(meth)acrylate; polyacrylonitrile; polyvinyl acetate; polycarbonate; polyarylate; regenerated cellulose; polyimide; polyetherimide; polysulfone; polyethersulfone; polyetheretherketone; and ionomer resins. When the multilayer structure is used as or in a packaging material, the material of the base (X) is preferably at least one thermoplastic resin selected from the group consisting of polyethylene, polypropylene, polyethylene terephthalate, nylon-6, and nylon-66.

When a film made of such a thermoplastic resin is used as the base (X), the base (X) may be an oriented film or non-oriented film. In terms of high suitability for processes (such as suitability for printing or lamination) of the resulting multilayer structure, an oriented film, particularly a biaxially-oriented film, is preferred. The biaxially-oriented film may be a biaxially-oriented film produced by any one method selected from simultaneous biaxial stretching, sequential biaxial stretching, and tubular stretching.

When the base (X) is in the form of a layer, the thickness of the base (X) is preferably in the range of 2 to 1,000 μm, more preferably in the range of 5 to 500 μm, and even more preferably in the range of 9 to 200 μm, in terms of high mechanical strength and good processability of the resulting multilayer structure.

[Layer (Y)]

The layer (Y) contains the polymer (A) having a functional group containing a phosphorus atom and may further contain the polymer (B). The polymer (A) is a polymer having a functional group containing a phosphorus atom. The polymer (B) has a hydroxy group and/or carboxyl group, The polymer (A) and the polymer (B) will be described hereinafter.

[Polymer (A)]

The polymer (A) having a functional group containing a phosphorus atom is not particularly limited as long as it contains a phosphorus atom. The polymer (A) is preferably a polymer (Aa) having at least one functional group selected from the group consisting of a phosphoric acid group, a phosphorous acid group, a phosphonic acid group, a phosphonous acid group, a phosphinic acid group, and a phosphinous acid group. The functional group of the polymer (A) is preferably a phosphoric acid group or phosphonic acid group, and more preferably a phosphonic acid group.

Examples of the polymer (Aa) include: polymers of phosphono(meth)acrylic acid esters such as 6-[(2-phosphonoacetyl)oxy]hexyl acrylate, 2-phosphonooxyethyl methacrylate, phosphonomethyl methacrylate, 11-phosphonoundecyl methacrylate, and 1,1-diphosphonoethyl methacrylate; polymers of vinylphosphonic acids such as vinylphosphonic acid, 2-propene-1-phosphonic acid, 4-vinylbenzylphosphonic acid, and 4-vinylphenylphosphonic acid; polymers of vinylphosphinic acids such as vinylphosphinic acid and 4-vinylbenzylphosphinic acid; and phosphorylated starch. The polymer (Aa) may be a homopolymer of a monomer having the at least one phosphorus atom-containing functional group or may be a copolymer of two or more monomers. Alternatively, a mixture of two or more polymers each consisting of a single monomer may be used as the polymer (Aa). In particular, a polymer of a phosphono(meth)acrylic acid ester and/or a polymer of a vinylphosphonic acid is preferred, and a polymer of a vinylphosphonic acid is more preferred. That is, a preferred example of the polymer (Aa) is poly(vinylphosphonic acid). The polymer (Aa) can be obtained also by homopolymerization or copolymerization of a vinylphosphonic acid derivative such as a vinylphosphonic acid halide or vinylphosphonic add ester, followed by hydrolysis.

Alternatively, the polymer (Aa) may be a copolymer of a monomer having the at least one phosphorus a atom-containing functional group and another vinyl monomer. Examples of the other vinyl monomer copolymerizable with the monomer having the phosphorus a atom-containing functional group include (meth)acrylic acid, (meth)acrylic acid esters, acrylonitrile, methacrylonitrile, styrene, nuclear-substituted styrenes, alkyl vinyl ethers, alkyl vinyl esters, perfluoroalkyl vinyl ethers, perfluoroalkyl vinyl esters, maleic acid, maleic anhydride, fumaric acid, itaconic acid, maleimide, and phenylmaleimide. Among these, (meth)acrylic acid esters, acrylonitrile, styrene, maleimide, and phenylmaleimide are preferred.

In order to obtain a multilayer structure that has better bending resistance, the proportion of the structural units derived from the monomer having the phosphorus atom-containing functional group in the total structural units of the polymer (Aa) is preferably 10 mol % or more, more preferably 20 mol % or more, even more preferably 40 mol % or more, and particularly preferably 70 mol % or more, and may be 100 mol %.

The molecular weight of the polymer (Aa) is not particularly limited. It is preferable that the number average molecular weight be in the range of 1,000 to 100,000. When the number average molecular weight is in this range, both a high level of improving effect of stacking of the layer (Y) on bending resistance and a high level of viscosity stability of the coating liquid (S) described later can be achieved. When the layer (Z) described later is stacked, the improving effect on bending resistance is further enhanced by using the polymer (Aa) whose molecular weight per phosphorus atom is in the range of 100 to 500.

[Polymer (B)]

Examples of the polymer (B) having a hydroxy group and/or carboxyl group include: polyvinyl alcohol-based polymers such as polyvinyl alcohol, modified polyvinyl alcohol containing 1 to 50 mol % of α-olefin units having 4 or less carbon atoms, and polyvinyl acetal (e.g., polyvinyl butyral); polysaccharides such as cellulose and starch; (meth)acrylic polymers such as polyhydroxyethyl (meth) acrylate, poly(meth)acrylic acid, and ethylene-(meth)acrylic acid copolymer; and maleic polymers such as a hydrolysate of ethylene-maleic anhydride copolymer, a hydrolysate of styrene-maleic anhydride copolymer, and a hydrolysate of isobutylene-maleic anhydride alternating copolymer. Among these, the polyvinyl alcohol-based polymers are preferred. More specifically, polyvinyl alcohol and modified polyvinyl alcohol containing 1 to 15 mol % of α-olefin units having 4 or less carbon atoms are preferred.

The polymer (B) may be a homopolymer of a monomer having a hydroxy group and/or carboxyl group (e.g., acrylic acid) or a monomer capable of forming a hydroxy group and/or carboxyl group by further reaction (e.g., hydrolysis reaction) after polymerization (e.g., vinyl acetate or acrylic acid ester), may be a copolymer of two or more monomers, or may be a copolymer of a monomer having a hydroxy group and/or carboxyl group and a monomer having none of these groups. A mixture of two or more polymers (B) may be used as the polymer (B).

The molecular weight of the polymer (B) is not particularly limited. In order to obtain a multilayer structure that has better gas barrier properties and mechanical properties (e.g., drop impact resistance), the number average molecular weight of the polymer (B) is preferably 5,000 or more, more preferably 8,000 or more, and on more preferably 10,000 or more. The upper limit of the number average molecular weight of the polymer (B) is not particularly defined, and is, for example, 1,500,000 or less.

The viscosity-average degree of polymerization of the polyvinyl alcohol-based polymer used in the present invention is preferably 100 to 4,000. In order to obtain a multilayer structure that has high interlayer adhesion, the viscosity-average degree of polymerization is more preferably 200 to 3,500, even more preferably 300 to 3,000, and particularly preferably 500 to 2,800. The values of the viscosity-average degree of polymerization are those determined according to JIS K 6726 (1994).

The degree of saponification of the polyvinyl alcohol-based resin used in the present invention is preferably 75.0 to 99.85 mol %. In order to obtain a multilayer structure that has high interlayer adhesion, the degree of saponification is more preferably 80.0 to 99.5 mol %, even more preferably 85.0 to 99.3 mol %, and particularly preferably 90.0 to 99.1 mol %. The values of the degree of saponification are those determined according to JIS K 6726 (1994).

The viscosity of the polyvinyl alcohol-based polymer used in the present invention is preferably 1.0 to 200 mPa·s. In order to obtain a multilayer structure that has high interlayer adhesion, the viscosity is more preferably 3.0 to 150 mPa·s, even more preferably 11 to 90 mPa·s, and particularly preferably 20 to 85 mPa·s. The values of the viscosity are those measured for a 4 mass % aqueous solution of the polyvinyl alcohol based polymer using a B-type rotational viscometer at 20° C. according to JIS K 6726 (1994).

The polyvinyl alcohol-based polymer used in the present invention is preferably one that has a degree of saponification of 85.0 to 99.3 mol %, a viscosity-average degree of polymerization of 200 to 3,500, and a viscosity of 11 to 90 mPa·s, and more preferably one that has a degree of saponification of 85.0 to 99.3 mol %, a viscosity-average degree of polymerization of 500 to 2,800, and a viscosity of 20 to 85 mPa·s.

The layer (Y) may consist only of the polymer (A), may consist only of the polymer (A) and the polymer (B), or may further contain an additional component. Examples of the additional component include: metal salts of inorganic acids such as a metal carbonate, a metal hydrochloride, a metal nitrate, a metal hydrogen carbonate, a metal sulfate, a metal hydrogen sulfate, and a metal borate; metal salts of organic acids such as a metal oxalate, a metal acetate, a metal tartrate, and a metal stearate; metal complexes such as a cyclopentadienyl metal complex (e.g., titanocene) and a cyanometal complex; layered clay compounds; crosslinking agents; polymer compounds other than the polymer (A) and polymer (B); plasticizers; antioxidants; ultraviolet absorbers; and flame retardants. The content of the additional component in the layer (Y) is preferably 50 mass % or less, more preferably 20 mass % or less, even more preferably 10 mass % or less, and particularly preferably 5 mass % or less, and may be 0 mass % (which means that the additional component is not contained). The layer (Y) is free of aluminum atoms which are contained in the layer (Z). In other words, the layer (Y) differs from the layer (Z) by being substantially free of aluminum atoms which are contained in the layer (Z).

In terms of allowing the multilayer structure to maintain good appearance, the content of the polymer (B) in the layer (Y) is preferably 85 mass % or less, more preferably 50 mass % or less, even more preferably 20 mass % or less, and particularly preferably 10 mass % or less, with respect to the mass of the layer (Y) (defined as 100 mass %). The polymer (B) may or may not react with another component in the layer (Y).

It is preferable for the thickness of one layer (Y) to be 0.003 μm or more, in terms of better bending resistance of the multilayer structure of the present invention. The upper limit of the thickness of the layer (Y) is not particularly defined; however, the improving effect, on bending resistance reaches a plateau when the thickness of the layer (Y) exceeds 1.0 μm. Hence, it is preferable to set the upper limit of the (total) thickness of the layer(s) (Y) to 1.0 μm for economical reasons. The thickness of the layer (Y) can be controlled depending on the concentration of the later-described coating liquid (S) used for forming the layer (Y) or the method for applying the liquid (S).

[Layer (Z)]

The multilayer structure of the present invention includes the layer (Z) containing aluminum atoms. It is preferable that the layer (Y) and the layer (Z) be stacked contiguous to (in contact with) each other. In other words, it is preferable that the multilayer structure of the present invention include at least one pair of the layer (Z) and the layer (Y) that are disposed contiguous to each other. It is preferable that the layer (Z) be disposed between the base (X) and the layer (Y) and be disposed contiguous to the layer (Y).

The layer (Z) may be a layer (Z1) containing a reaction product (E) formed by a reaction between a metal oxide (C) containing an aluminum atom and a phosphorus compound (D). A compound formed by a reaction among the metal oxide (C), the phosphorus compound (D), and still another compound is also classified as the reaction product (E) herein. The layer (Z) may be a layer (Z2) that is a deposited layer of aluminum. The layer (Z) may be a deposited layer of a compound containing an aluminum atom, or a layer (Z3) that is a deposited layer of aluminum oxide.

[Layer (Z1)]

Examples of the structure of the reaction product (E) contained in the layer (Z1) include a structure in which particles of the metal oxide (C) are bonded together via phosphorus atoms derived from the phosphorus compound (D). The forms in which the particles are bonded via phosphorus atoms Include a form in which the particles are bonded via atomic groups containing a phosphorus atom, and examples of such a form include a form in which the particles are bonded via atomic groups containing a phosphorus atom and con laming no metal atom. The layer (Z1) may partially contain the metal oxide (C) and/or phosphorus compound (D) that remains uninvolved in any reaction.

In the layer (Z1), the molar ratio between the metal atoms constituting the metal oxide (C) and the phosphorus atoms derived from the phosphorus compound (D), as expressed by [Metal atoms constituting metal oxide (C)]:[Phosphorus atoms derived from phosphorus compound (D)], is preferably in the range of 1.0:1.0 to 3.6:1.0, and more preferably in the range of 1.1:1.0 to 3.0:1.0. If the molar ratio falls outside such a range, the gas barrier performance deteriorates. The molar ratio in the layer (Z1) can be adjusted depending on the mixing ratio between the metal oxide (C) and the phosphorus compound (D) in a coating liquid for forming the layer (Z1). The molar ratio in the layer (Z1) is typically equal to that in the coating liquid.

In an infrared absorption spectrum of the layer (Z1), a maximum absorption wavenumber in the region of 800 to 1,400 cm$^{-1}$ is preferably 1,080 to 1,130 cm$^{-1}$. In the process in which the metal oxide (C) and the phosphorus compound (D) react to form the reaction product (E), a metal atom (M) derived from the metal oxide (C) and a phosphorus atom (P) derived from the phosphorus compound (D) are linked via an oxygen atom (O) to form a bond represented by M—O—P. As a result, a characteristic absorption band attributed to this bond appears in an infrared absorption spectrum of the reaction product (E). A study by the present inventors has revealed that the resulting multilayer structure exhibits good gas barrier properties when the characteristic absorption band attributed to the M-O—P bond is observed in the region of 1,080 to 1,130 cm$^{-1}$. It has been found that the resulting multilayer structure exhibits much better gas barrier properties particularly when the characteristic absorption band corresponds to the strongest absorption in the region of 800 to 1,400 cm$^{-1}$ where absorptions attributed to bonds between various atoms and oxygen atoms are generally observed.

By contrast, if a metal compound such as a metal alkoxide or metal salt and the phosphorus compound (D) are first mixed together and the mixture is then subjected to hydrolytic condensation, the resulting product is a composite material in which the metal atoms derived from the metal compound and the phosphorus atoms derived from the phosphorus compound (D) have been almost homogeneously mixed and reacted. In this case, in an infrared absorption spectrum of the composite material, the maximum absorption wavenumber in the region of 800 to 1,400 cm$^{-1}$ falls outside the range of 1,080 to 1,130 cm$^{-1}$.

In the infrared absorption spectrum of the layer (Z1), the half width of the maximum absorption band in the region of 800 to 1,400 cm$^{-1}$ is preferably 200 cm$^{-1}$ or less, more preferably 150 cm$^{-1}$ or less, even more preferably 100 cm$^{-1}$ or less, and particularly preferably 50 cm$^{-1}$ or less, in terms of the gas barrier properties of the resulting multilayer structure.

The infrared absorption spectrum of the layer (Z1) can be measured by the method described below in "EXAMPLES".

If the measurement is not possible by the method described in "EXAMPLES", the measurement may be conducted by another method, examples of which include, but are nut limited to: reflection spectroscopy such as reflection absorption spectroscopy, external reflection spectroscopy, or attenuated total reflection spectroscopy; and transmission spectroscopy such as Nujol method or pellet method performed on the layer (Z1) scraped from the multilayer structure.

The layer (Z1) has a structure in which particles of the metal oxide (C) are bonded together via phosphorus atoms derived from the phosphorus compound (D) and not via metal atoms other than those derived from the metal oxide (C). That is, the layer (Z1) has a structure in which the particles of the metal oxide (C) may be bonded together via metal atoms derived form the metal oxide (C) but are not bonded via other metal atoms. The "structure in which particles of the metal oxide (C) are bonded together via phosphorus atoms derived from the phosphorus compound (D) and not via metal atoms other than those derived from the metal oxide (C)" as defined herein refers to a structure in which the main chain of the bond between the bonded particles of the metal oxide (C) has a phosphorus atom derived from the phosphorus compound (D) and does not have any metal atoms other than those derived from the metal oxide (C) and embraces a structure in which the side chain of the bond has a metal atom. It should be noted that the layer (Z1) may partially have a structure in which the particles of the metal oxide (C) are bonded together via both phosphorus atoms derived from the phosphorus compound (D) and metal atoms (structure in which, the main chain of the bond between the bonded particles of the metal oxide (C) has both a phosphorus atom derived from the phosphorus compound (D) and a metal atom).

In the layer (Z1) the number of moles of metal atoms binding the particles of the metal oxide (C) together and being different from those derived from the metal oxide (C) is preferably in the range of 0 to 1 times (e.g., 0 to 0.9 times) the number of moles of phosphorus atoms binding the particles of the metal oxide (C) together.

Examples of the form of bonding between each particle of the metal oxide (C) and a phosphorus atom in the layer (Z1) include a form in which the metal atom (M) constituting the metal oxide (C) and the phosphorus atom (P) are bonded via the oxygen atom (O). The particles of the metal oxide (C) may be bonded together via the phosphorus atom (P) derived from one molecule of the phosphorus compound (D) or may be bonded together via the phosphorus atoms (P) derived from two or more molecules of the phosphorus compound (D). Specific examples of the form of bonding between two bonded particles of the metal oxide (C) include a bonding form represented, by (Mα)-O—P—O-(Mβ), a bonding form represented by (Mα)-O—P—[O—P]$_n$—O-(Mβ), a bonding form represented by (Mα)-O—P-E-P—O-(Mβ), and a bonding form represented by (Mα)-O—P-E-P—[O—P-E-P]$_n$—O-(Mβ), where (Mα) denotes a metal atom constituting one of the bonded particles of the metal oxide (C) and (Mβ) denotes a metal atom constituting the other of the particles of the metal oxide (C). In the examples of the bonding form, n represents an integer of 1 or more, E represents a constituent atomic group present between two phosphorus atoms when the phosphorus compound (D) has two or more phosphorus atoms per molecule, and the other substituents bonded to the phosphorus atoms are omitted.

In the layer (Z1), it is preferable that one particle of the metal oxide (C) be bonded to two or more other particles of the metal oxide (C), in terms of the gas barrier properties of the resulting multilayer structure.

The metal oxide (C) may be a hydrolytic condensate of a compound (G) containing the metal atom (M) to which a hydrolyzable characteristic group is bonded. Examples of the characteristic group include $R^1$ in the general formula (I) described later. The hydrolytic condensate of the compound (G) can be regarded substantially as a metal oxide. Thus, the hydrolytic condensate of the compound (G) may be referred to as "metal oxide (C)" herein. That is, the term "metal oxide (C)" as used herein is interchangeable with the term "hydrolytic condensate of the compound (G)", while the term "hydrolytic condensate of the compound (G)" as used herein is interchangeable with the term "metal oxide (C)".

The thickness of the layer (Z1) (or, for a multilayer structure including two or more layers (Z1), the total thickness of the layers (Z1)) is preferably in the range of 0.05 μm to 4.0 μm, and more preferably in the range of 0.1 μm to 2.0 μm. Thinning the layer (Z1) provides a reduction in the dimensional change that the multilayer structure can undergo during a process such as printing or lamination. Thinning the layer (Z1) also provides an increase in the flexibility of the multilayer structure, thus making it possible to allow the multilayer structure to have mechanical characteristics close to mechanical characteristics intrinsic to the base. When the multilayer structure of the present invention has two or more layers (Z1), it is preferable for the thickness of each layer (Z1) to be preferably 0.05 μm or more, in terms of the gas barrier properties. The thickness of the layer (Z1) can be controlled depending on the concentration of the later-described coating liquid (T) used for forming the layer (Z1) or the method for applying the liquid (T).

The thickness of the layer (Z1) can be measured by observing a cross-section of the multilayer structure with a scanning electron microscope or transmission electron microscope. The thicknesses of the layer (Y) and other layers can be measured in the same manner.

[Metal Oxide (C)]

The metal oxide (C) used in the present invention is typically in the form of particles when reacted with the phosphorus compound (D).

The metal atoms constituting the metal oxide (C) (the metal atoms may be collectively referred to as "metal atoms (M)") include at least one metal atom selected from atoms of metals belonging to Groups 2 to 14 of the periodic table, and include at least aluminum atoms. The metal atoms (M) may consist of aluminum atoms alone or may include aluminum atoms and other metal atoms. A mixture of two or more metal oxides (C) may be used, as the metal oxide (C).

The proportion of aluminum atoms in the metal atoms (M) is typically 50 mol % or more, and may be in the range of 60 mol % to 100 mol % or in the range of 80 mol % to 100 mol %. Examples of the metal oxide (C) include metal oxides produced by methods such as liquid-phase synthesis, gas-phase synthesis, and solid grinding.

[Compound (G)]

In terms of ease of control of the reaction and in terms of good gas barrier properties of the resulting multilayer structure, the compound (G) preferably includes at least one compound (G1) represented by the following general formula [I].

$$Al(R^1)_k(R^2)_{3-k} \quad \text{[I]}$$

In the formula, $R^1$ is a halogen atom (fluorine atom, chlorine atom, bromine atom, or iodine atom), $NO_3$, an optionally substituted alkoxy group having 1 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, or a diacylmethyl group having an optionally substituted acyl group having 1 to 9 carbon atoms. $R^2$ is an optionally substituted alkyl group having 1 to 9 carbon atoms, an optionally substituted aralkyl group having 7 to 10 carbon atoms, an optionally substituted alkenyl group having 2 to 9 carbon atoms, or an optionally substituted aryl group having 6 to 10 carbon atoms. k is an integer of 1 to 3. When there are two or more atoms or groups represented by $R^1$, the atoms or groups represented by $R^1$ may be the same as or different from each other. When there are two or more atoms or groups represented by $R^2$, the atoms or groups represented by $R^2$ may be the same as or different from each other.

The compound (G) may include, in addition to the compound (G1) at least one compound (G2) represented by the following general formula [II].

$$M^1(R^3)_m(R^4)_{n-m} \quad \text{[II]}$$

in the formula, $M^1$ least one metal atom different from an aluminum atom and selected from atoms of metals belonging to Groups 2 to 14 of the periodic table. $R^3$ is a halogen atom (fluorine atom, chlorine atom, bromine atom, or iodine atom), $NO_3$, an optionally substituted alkoxy group having 1 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, or a diacylmethyl group having an optionally substituted acyl group having 1 to 9 carbon atoms. $R^4$ is an optionally substituted alkyl group having 1 to 9 carbon atoms, an optionally substituted aralkyl group having 7 to 10 carbon atoms, an optionally substituted alkenyl group having 2 to 9 carbon atoms, or an optionally substituted aryl group having 8 to 10 carbon atoms. m is an integer of 1 to n. n is equal to the valence of $M^1$. When there are two or more atoms or groups represented by $R^3$, the atoms or groups represented by $R^3$ may be the same as or different from each other. When there are two or more atoms or groups represented by $R^4$, the atoms or groups represented by $R^4$ may be the same as or different from each other.

Examples of the alkoxy groups represented by $R^1$ and $R^3$ include methoxy ethoxy, n-propoxy, isopropoxy, n-butoxy, isobutoxy, sec-butoxy, tert-butoxy, benzyloxy, diphenylmethoxy, trityloxy, 4-methoxybenzyloxy, methoxymethoxy, 1-ethoxyethoxy, benzyloxymethoxy, 2-trimethylsilylethoxy, 2-trimethylsilylethoxymethoxy, phenoxy, and 4-methoxyphenoxy groups.

Examples of the acyloxy groups represented by $R^1$ and $R^3$ include acetoxy, ethylcarbonyloxy, n-propylcarbonyloxy, isopropylcarbonyloxy, n-butylcarbonyloxy, isobutylcarbonyloxy, sec-butylcarbonyloxy, tert-butylcarbonyloxy, and n-octylcarbonyloxy groups.

Examples of the alkenyloxy groups represented by $R^1$ and $R^3$ include allyloxy, 2-propenyloxy, 2-butenyloxy, 1-methyl-2-propenyloxy, 3-butenyloxy, 2-methyl-2-propenyloxy, 2-pentenyloxy, 3-pentenyloxy, 4-pentenyloxy, 1-methyl-2-butenyloxy, 1,2-dimethyl-2-propenyloxy, 1,1-dimethyl-2-propenyloxy, 2-methyl-2-butenyloxy, 3-methyl-2-butenyloxy, 2-methyl-3-butenyloxy, 3-methyl-3-butenyloxy, 1-vinyl-2-propenyloxy, and 5-hexenyloxy groups.

Examples of the β-diketonato groups represented by $R^1$ and $R^3$ include 2,4-pentanedionato, 1,1,1-trifluoro-2,4-pentanedionato, 1,1,1,5,5,5-hexafluoro-2,4-pentanedionato, 2,2,6,6-tetramethyl-3,5-heptanedionato, 1,3-butanedionato, 2-methyl-1,3-butanedionato, 2-methyl-1,3-butanedionato, and benzoylacetonato groups.

Examples of the acyl groups of the diacylmethyl groups represented by $R^1$ and $R^3$ include aliphatic acyl groups having 1 to 6 carbon atoms such as formyl, acetyl propionyl (propanoyl), butyryl (butanoyl), valeryl (pentanoyl), and hexanoyl groups; and aromatic acyl (aroyl) groups such as benzoyl and toluoyl groups.

Examples of the alkyl groups represented by $R^2$ and $R^4$ include methyl, ethyl, n-propyl, isopropyl, n-butyl, isobutyl, sec-butyl, tert-butyl, n-pentyl, isopentyl, n-hexyl, isohexyl, 3-methylpentyl, 2-methylpentyl, 1,2-dimethylbutyl, cyclopropyl, cyclopentyl, and cyclohexyl groups.

Examples of the aralkyl groups represented by $R^2$ and $R^4$ include benzyl and phenylethyl (phenethyl) groups.

Examples of the alkenyl groups represented by $R^2$ and $R^4$ include vinyl, 1-propenyl, 2-propenyl, isopropenyl, 3-butenyl, 2-butenyl, 1-butenyl, 1-methyl-2-propenyl, 1-methyl-1-propenyl, 1-ethyl-1-ethenyl, 2-methyl-2-propenyl, 2-methyl-1-propenyl, 3-methyl-2-butenyl, and 4-pentenyl groups.

Examples of the aryl groups represented by $R^2$ and $R^4$ include phenyl, 1-naphthyl, and 2-naphthyl groups.

Examples of the substituents in $R^1$, $R^2$, $R^3$, and $R^4$ include: alkyl groups having 1 to 6 carbon atoms; alkoxy groups having 1 to 6 carbon atoms such as methoxy, ethoxy, n-propoxy, isopropoxy, n-butoxy, isobutoxy, sec-butoxy, tert-butoxy, n-pentyloxy, isopentyloxy, n-hexyloxy; cyclopropyloxy, cyclobutyloxy, cyclopentyloxy, and cyclohexyloxy groups; alkoxycarbonyl groups having 1 to 6 carbon atoms such as methoxycarbonyl, ethoxycarbonyl, n-propoxycarbonyl, isopropoxycarbonyl, n-butoxycarbonyl, isobutoxycarbonyl, sec-butoxycarbonyl, tert-butoxycarbonyl, n-pentyloxycarbonyl, isopentyloxycarbonyl, cyclopropyloxycarbonyl, cyclobutyloxycarbonyl, and cyclopentyloxycarbonyl groups; aromatic hydrocarbon groups such as phenyl, tolyl, and naphthyl groups; halogen atoms such as fluorine, chlorine, bromine, and iodine atoms; acyl groups having 1 to 6 carbon atoms; aralkyl groups having 7 to 10 carbon atoms; aralkyloxy groups having 7 to 10 carbon atoms; alkylamino groups having 1 to 6 carbon atoms; and dialkylamino groups having an alkyl group having 1 to 6 carbon atoms.

It is preferable for $R^1$ to be a halogen atom, $NO_3$ an optionally substituted alkoxy group having 1 to 6 carbon atoms, an optionally substituted acyloxy group having 2 to 6 carbon atoms, an optionally substituted β-diketonato group having 5 to 10 carbon atoms, or a diacylmethyl group having an optionally substituted acyl group having 1 to 6 carbon atoms.

It is preferable for $R^2$ to be an optionally substituted alkyl group having 1 to 6 carbon atoms. In the formula [I], is preferably 3.

It is preferable for to be a halogen atom, $NO_3$, an optionally substituted alkoxy group having 1 to 6 carbon atoms, an optionally substituted acyloxy group having 2 to 6 carbon atoms, an optionally substituted β-diketonato group having 5 to 10 carbon atoms, or a diacylmethyl group having an optionally substituted acyl group having 1 to 6 carbon atoms.

It is preferable for $R^4$ to be an optionally substituted alkyl group having 1 to 6 carbon atoms. It is preferable for $M^1$ to be an atom of a metal belonging to Group 4 of the periodic table, and more preferably a titanium or zirconium atom.

When $M^1$ is an atom of a metal belonging to Group 4 of the periodic table, m in the formula [II] is preferably 4.

Boron and silicon are categorized as metals herein, although they may be classified as semimetals in other contexts.

Examples of the compound (G1) include aluminum chloride, aluminum nitrate, aluminum acetate, tris(2,4-pentanedionato)aluminum, trimethoxyaluminum, triethoxyaluminum, tri-n-propoxyaluminum, triisopropoxyaluminum, tri-n-butoxyaluminum, tri-sec-butoxyaluminum, and tri-tert-butoxyaluminum. Among these, triisopropoxyluminum and tri-sec-butoxyaluminum are more preferred. A mixture of two or more compounds (G1) may be used as the compound (G).

Examples of the compound (G2) include: titanium compounds such as tetrakis(2,4-pentanedionato)titanium, tetramethoxytitanium, tetraethoxytitanium, tetraisopropoxytitanium, tetra-n-butoxytitanium, and tetrakis(2-ethylhexoxy)titanium; and zirconium compounds such, as tetrakis(2,4-pentanedionato)zirconium, tetra-n-propoxyzirconium, and tetra-n-butoxyzirconium. These may be used alone or two or more compounds (G2) may be used in combination.

The proportion of the compound (G1) in the total amount of the compound (G) is not particularly limited as long as the effect of the present invention is obtained. The proportion of the compound (e.g., the compound (G2)) other than the compound (G1) in the total amount of the compound (G) is preferably 20 mol % or less, more preferably 10 mol % or less, and even more preferably 5 mol % or less, and may be 0 mol %, for example.

The compound (G) is hydrolyzed, so that at least some of the hydrolyzable characteristic groups of the compound (G) are converted to hydroxy groups. The hydrolysate is then condensed to form a compound in which the metal atoms (M) are linked together via an oxygen atom (O). The repetition of this condensation results in the formation of a compound that can be substantially regarded as a metal oxide. In general, the thus formed metal oxide (C) has hydroxy groups present on its surface.

A compound is categorized as the metal oxide (C) herein when the ratio, [the number of moles of the oxygen atoms (O) bonded only to the metal atoms (M)]/[the number of moles of the metal atoms (M)], is 0.8 or more in the compound. The "oxygen atom (O) bonded only to the metal atom (M)", as defined herein, refers to the oxygen atom (O) in the structure represented by M-O-M, and does not include an oxygen atom that is bonded to both the metal atom (M) and hydrogen atom (H) as is the case for the oxygen atom (O) in the structure represented by M-O—H. The above ratio in the metal oxide (C) is preferably 0.9 or more, more preferably 1.0 or more, and even more preferably 1.1 or more. The upper limit of this ratio is not particularly defined. When the valence of the metal atom (M) is denoted by n, the upper limit is typically expressed as n/2.

In order for the hydrolytic condensation to take place, it is important that the compound (G) has hydrolyzable characteristic groups. When there are no such groups bonded, hydrolytic condensation reaction does not occur or proceeds very slowly, which makes difficult the preparation of the metal oxide (C) intended.

The hydrolytic condensate of the compound (G) may be produced, for example, from a particular raw material by a technique employed in commonly-known sol-gel processes. As the raw material there can be used at least one selected from the group consisting of the compound (G), a partial hydrolysate of the compound (G), a complete hydrolysate of the compound (G), a compound formed by partial, hydrolytic condensation of the compound (G), and a compound formed by condensation of a part of a complete hydrolysate of the compound (G).

The metal oxide (C) to be mixed with the phosphorus compound (D)-containing material (the phosphorus compound (D) itself or a composition containing the phosphorus compound (D)) is preferably substantially free of phosphorus atoms.

The layer (Z1) has a particular structure in which the particles of the metal oxide (C) are bonded together via phosphorus atoms derived from the phosphorus compound (D). The shape and size of the particles of the metal oxide (C) contained in the layer (Z1) and the shape and size of the particles of the metal oxide (C) to be mixed with the phosphorus compound (D)-containing material (the phosphorus compound (D) itself or a composition containing the phosphorus compound (D)) may be the same or different. That is, the particles of the metal oxide (C) used as a raw material of the layer (Z1) may change in shape or size during the process of formation of the layer (Z1).

[Phosphorus Compound (D)]

The phosphorus compound (D) has a moiety capable of reacting with the metal oxide (C) and typically has two or more such moieties. In a preferred example, the phosphorus compound (D) contains 2 to 20 such moieties (atomic groups or functional groups). Examples of such moieties include a moiety capable of reacting with a functional group (e.g., hydroxy group) present on the surface of the metal oxide (C). Examples of such a moiety include a halogen atom bonded directly to a phosphorus atom and an oxygen atom bonded directly to a phosphorus atom. Such a halogen atom or oxygen atom is capable of undergoing condensation reaction (hydrolytic condensation reaction) with a hydroxy group present on the surface of the metal oxide (C). In general, the functional group (e.g., hydroxy group) present on the surface of the metal oxide (C) is bonded to the metal atom (M) constituting the metal oxide (C).

The phosphorus compound (D) used may be one that has a structure in which a halogen atom or oxygen atom is bonded directly to a phosphorus atom. Such a phosphorus compound (D) is capable of forming bonds with hydroxy groups present on the surface of the metal oxide (C) through (dehydration) condensation. The phosphorus compound (D) may have one phosphorus atom or may have two or more phosphorus atoms.

The phosphorus compound (D) may be at least one selected from the group consisting of phosphorus oxoacids such as phosphoric acid, diphosphoric acid, triphosphoric acid, polyphosphoric acid formed by condensation of 4 or more molecules of phosphoric acid, phosphorous acid, phosphonic acid, phosphonous acid, phosphinic acid, and phosphinous acid; and derivatives of these oxoacids (e.g., salts, (partial) ester compounds, halides (such as chlorides) and dehydration products (such as phosphorus pentoxide)).

One of these phosphorus compounds (D) may be used alone or two or more thereof may be used in combination. Among the above examples of the phosphorus compound (D), phosphoric acid is preferably used alone or in combination with another phosphorus compound (D). The use of phosphoric acid improves the stability of the coating liquid (T) described later and the gas barrier properties of the resulting multilayer structure.

The layer (Z1) may contain a particular polymer (F). The polymer (F) may be a polymer having at least one functional group selected from the group consisting of a hydroxy group, a carboxyl group, a carboxylic anhydride group, and a salt, of a carboxyl group. For example, the polymer (F) may be any of the polymers mentioned as examples of she polymer (B). The layer (Z1) may further contain an additional component other than the polymer (F). Examples of the additional component include the substances mentioned as examples of the additional component that may be contained in the layer (Y). The content of the additional component in the layer (Z1) is preferably 50 mass % or less, more preferably 20 mass % or less, even more preferably 10 mass % or less, and particularly preferably 5 mass % or less.

[Inorganic Deposited Layer: Layer (Z2) and Layer (Z3)]

The multilayer structure may include an inorganic deposited layer. Such an inorganic deposited layer may be formed from a metal, metal oxide, metal oxynitride, metal carbonitride, metal oxycarbide, silicon nitride, carbon-containing silicon oxide (silicon carbonitride), oxygen-containing silicon nitride (silicon oxynitride), or the like. The layer (Z) in the multilayer structure of the present invention may be an inorganic deposited layer containing aluminum. For example, the layer (Z) may include a layer (Z2) that is a deposited layer of aluminum and/or a layer (Z3) that is a deposited layer of aluminum oxide. In an example, the layer (Z) is the layer (Z2) or layer (Z3).

The method for forming the inorganic deposited layer is not particularly limited, and available methods include: physical vapor deposition processes such as vacuum vapor deposition (e.g., resistive heating vapor deposition, electron beam vapor deposition, and molecular beam epitaxy), sputtering, and ion plating; and chemical vapor deposition processes such as thermal chemical vapor deposition (e.g., catalytic chemical vapor deposition), photochemical vapor deposition, plasma chemical vapor deposition (e.g., capacitively coupled plasma process, inductively coupled plasma process, surface wave plasma process, electron cyclotron resonance plasma process, and dual magnetron process), atomic layer deposition, and organometallic vapor deposition. The thickness of the inorganic deposited layer is preferably in the range of 0.002 to 0.5 µm, although the specific preferred thickness depends on the type of the component of the inorganic deposited layer. A thickness at which good barrier properties and mechanical properties of the multilayer structure are achieved can be selected within the above range. If the thickness of the inorganic deposited layer is less than 0.002 µm, the inorganic deposited layer tends to have a low ability to repeatedly exhibit the barrier properties against oxygen and water vapor, and the inorganic deposited layer may fail to exhibit sufficient banner properties. If the thickness of the inorganic deposited layer is more than 0.5 µm, the barrier properties of the inorganic deposited layer are likely to deteriorate when the multilayer structure is pulled or bent. The thickness of the inorganic deposited layer is more preferably in the range of 0.005 to 0.2 µm, and even more preferably in the range of 0.01 to 0.1 µm.

[Method for Producing Multilayer Structure (Multilayer Label)]

The multilayer structure (multilayer label) of the present invention can be produced by a production method of the present invention. The features described for the multilayer structure of the present invention can be applied to the production method of the present invention and may not be described repeatedly. The features described for the production method of the present invention can be applied to the multilayer structure of the present invention.

The production method of the present invention is a method for producing the multilayer structure (multilayer label) of the present invention. This production method includes a layer (Y) formation step and a layer (Z) formation step. The layer (Y) formation step includes: a step (Y-i) of preparing a coating liquid (S) containing a polymer (A) and a solvent; and a step (Y-ii) of forming the layer (Y) on the base (X) using the coating liquid (S). The layer (Z) formation step will be described later. The coating liquid (S) may contain a polymer (B). In the case where the coating liquid (S) contains the polymer (B), it is preferable that the polymer (A) and the polymer (B) be mixed at a mass ratio of 15:85 to 99:1 in the step (Y-i). This results in the formation of the layer (Y) containing the polymer (A) and polymer (B) mixed at this ratio. The polymer (A), the polymer (B), and the mass ratio therebetween are as previously described, and will not be described repeatedly.

[Coating Liquid (S)]

The solvent used in the coating liquid (S) can be optionally selected depending on the types of the polymer (A) (and optionally polymer (B)). The solvent is preferably water, an alcohol, or a mixed solvent thereof. The solvent may contain any of the following substances as long as the dissolution of the polymer (A) (and the polymer (B)) is not hindered: ethers such as tetrahydrofuran, dioxane, trioxane, and dimethoxyethane; ketones such as acetone and methyl ethyl ketone; glycols such as ethylene glycol and propylene glycol; glycol derivatives such as methyl cellosolve, ethyl cellosolve, and n-butyl cellosolve: glycerin; acetonitrile; amides such as dimethylformamide; dimethyl sulfoxide; and sulfolane.

The concentration of the solids of the polymer (such as the polymer (A)) in the coating liquid (S) is preferably in the range of 0.01 to 60 mass %, more preferably in the range of 0.1 to 50 mass %, and even more preferably in the range of 0.2 to 40 mass %, in terms of the storage stability and coating properties of the liquid. The solids concentration can be determined in the same manner as described later for the coating liquid (T).

In terms of the storage stability of the coating liquid (S) and the gas harrier properties of the multilayer structure, the pH of the coating liquid (S) is preferably in the range of 0.1 to 6.0, more preferably in the range of 0.2 to 5.0, and even more preferably in the range of 0.5 to 4.0. The pH of the coating liquid (S) can be adjusted by a commonly-known method. For example, the pH can be adjusted by adding an acidic or basic compound to the coating liquid (S).

In the step (Y-ii), the layer (Y) is formed typically by applying the coating liquid (S) and then removing the solvent. The method for applying the coating liquid (S) is not particularly limited, and any commonly-known method can be employed. Examples of the application method include casting, dipping, roll coating, gravure coating, screen printing, reverse coating, spray coating, kiss coating, die coating, metering bar coating, chamber doctor-using coating, curtain coating, and bar coating.

The method for removing the solvent from the coating liquid (S) is not particularly limited, and any commonly-known drying method can be employed. Examples of the drying method include hot air drying, hot roll contact drying, infrared heating, and microwave heating. The drying temperature is preferably 0 to 15° C. or more lower than the onset temperature of fluidization of the base (X).

[Layer (Z) Formation Step]

The production method of the present invention includes a step of forming the layer (Z) containing aluminum atoms on the base (X). The layer (Z) formation step results in the multilayer structure including the layer (Z). It is preferable that the he layer (Z) and the layer (Y) be formed contiguous to each other.

The layer (Z) formation step may be performed at any time. For example, the layer (Z) formation step may be performed before the step (Y-i), after the step (Y-ii), or at any time between the steps (Y-i) and (Y-ii). It is preferable to perform the layer (Z) formation step before the step (Y-i). When the layer (Y) is to be disposed between the base (X) and the layer (Z), the layer (Z) formation step is performed after the step (Y-ii). When the layer (Z) is to be disposed between the base (X) and the layer (Y), the layer (Z) formation step is performed before the step (Y-ii). In this case, the coating liquid (S) is applied to the layer (Z) in the step (Y-ii).

When the layer (Z) is a layer (Z2) that is a deposited layer of aluminum or a layer (Z3) that is a deposited layer of aluminum oxide, the deposited layer can be formed by any of the common vapor deposition processes mentioned above. Thus, the following will describe the method for forming the layer (Z1) in detail. An example of the method for forming the layer (Z1) is described in JP 2013-208794 A.

When the layer (Z1) is to be formed, the layer (Z) formation step may include steps (Z-i), (Z-ii), and (Z-iii). In the step (Z-i), a metal oxide (C), a phosphorus compound (D), and a solvent are mixed to prepare a coating liquid (T). In the step (Z-ii), the coating liquid (T) is applied onto the base (X) to form a precursor layer of the layer (Z1) on the base (X). In the step (Z-iii), the precursor layer is heat-treated at a temperature of 110° C. or higher to form the layer (Z1) on the base (X). The details of the steps (Z-i) to (Z-iii) will be described below.

The step (Z-i), step (Z-ii), step (Z-iii), and step (Y-ii) are carried out typically in this order. When the layer (Y) is to be formed between the base (X) and the layer (Z1), the step (Y-ii) is carried out before the step (Z-ii) (may be carried out before the step (Z-i)). The step (Y-ii) may be carried out between the step (Z-ii) and the step (Z-iii). It is preferable to carry out the step (Y-ii) after the step (Z-iii) to allow the resulting multilayer structure to have good appearance.

[Step (Z-i)]

In the step (Z-i), the metal oxide (C), the phosphorus compound (D), and a solvent are at least mixed to prepare the coating liquid (T) containing them. From another standpoint, the metal oxide (C) and the phosphorus compound (D) are reacted in the solvent in the step (Z-i). Another compound (e.g., the polymer (F)) may be present with the metal oxide (C), phosphorus compound (D), and solvent when they are mixed.

[Dispersion of Metal Oxide (C)]

When the metal oxide (C) is aluminum oxide, the preparation of a dispersion of aluminum oxide is started by subjecting an aluminum alkoxide to hydrolytic condensation in an aqueous solution whose pH has optionally been adjusted by addition of an acid, thus giving a slurry of aluminum oxide. Next, the slurry is deflocculated in the presence of a certain amount of acid to obtain the dispersion of aluminum oxide. A dispersion of the metal oxide (C) containing an atom of a metal other than aluminum can be produced in the same manner.

Preferred examples of the acid catalyst used in hydrolytic condensation include hydrochloric acid, sulfuric acid, nitric acid, acetic acid, lactic acid, and butyric acid, among which nitric acid and acetic acid are more preferred. When an acid catalyst is used in hydrolytic condensation, it is preferable to use the acid catalyst in an appropriate amount depending on the type of the acid so that the pH falls within the range of 2.0 to 4.0 before the hydrolytic condensation,.

The step (Z-i) preferably includes the following steps (Z-i-1) to (Z-i-3),

Step (Z-i-1): Step of preparing a dispersion (J) containing the metal oxide (C).

Step (Z-i-2): Step of preparing a solution (K) containing the phosphorus compound (D).

Step (Z-i-3): Step of mixing the dispersion (J) obtained in the step (Z-i-1 and the solution (K) obtained in the step (Z-i-2).

The step (Z-i-2) may be performed prior to the step (Z-i-1), simultaneously with the step (Z-i-1) subsequent to the step (Z-i-1).

[Step (Z-i-1)]

In the step (Z-i-1), the dispersion (J) containing the metal oxide (C) is prepared. The dispersion (J) may be a dispersion of the metal oxide (C). The dispersion (J) can be prepared, for example, by mixing the compound (G), water, and optionally an acid catalyst and/or organic solvent and subjecting the compound (G) to condensation or hydrolytic condensation according to procedures employed in commonly-known sol-gel processes. The dispersion of the metal oxide (C) resulting from condensation or hydrolytic condensation of the compound can be used per se as the dispersion (J) containing the metal oxide (C). The dispersion (J) may be subjected to a certain process (such as deflocculation as described above or addition or removal of the solvent for concentration control) as necessary. The solvent used in the step (Z-i-1) is not particularly limited. Preferred are: alcohols such as methanol, ethanol, and isopropanol; water; and mixed solvents thereof. The step (Z-i-1) may further Include a step of subjecting at least one compound selected from the compound (G) and a hydrolysate of the compound (G) to condensation (e.g., hydrolytic condensation).

[Step (Z-i-2)]

In the step (Z-i-2), the solution (K) containing the phosphorus compound (D) is prepared. The solution (K) is prepared by dissolving the phosphorus compound (B) in a solvent. When the solubility of the phosphorus compound (D) is low, the dissolution may be promoted by heating or ultrasonication.

The solvent used in the preparation of the solution may be selected as appropriate depending on the type of the phosphorus compound and preferably contains water. The solvent may contain an organic solvent as long as the organic solvent does not hinder the dissolution of the phosphorus compound (D).

[Step (Z-i-3)]

In the step (Z-i-3), the dispersion (J) and the solution (K) are mixed. The coating liquid (T) may contain the polymer (F). The coating liquid (T) may contain at least one acid compound (Q) selected from acetic acid, hydrochloric acid, nitric acid, trifluoroacetic acid, and trichloroacetic acid, as necessary. The solution obtained in the step (Z-i-3) can be used per se as the coating liquid (T). In this case, the solvent contained in the dispersion (J) or in the solution (K) typically serves as the solvent of the coating liquid (T). Alternatively, the solution obtained in the step (Z-i-3) may be subjected to a process such as addition of an organic solvent, adjustment of the pH, or addition of an additive, and the resulting liquid may be used as the coating liquid (T).

The pH of the coating liquid (T) is preferably in the range of 0.1 to 6.0, more preferably in the range of 0.2 to 5.0, and even more preferably in the range of 0.5 to 4.0, in terms of the storage stability of the coating liquid (T) and the gas barrier properties of the multilayer structure. The pH of the coating liquid (T) can be adjusted by a commonly-known method, an example of which is to add an acidic or basic compound to the coating liquid (T).

[Step (Z-ii)]

In the step (Z-ii), the coating liquid (T) is applied onto the base (X) to form a precursor layer of the layer (Z1) on the base (X). The coating liquid (T) may be applied directly onto at least one surface of the base (X) or applied onto the base (X) with another layer interposed therebetween. An adhesive layer (L) may be formed on a surface of the base (X) by treating the surface of the base (X) with a commonly-known anchor coating agent or applying a commonly-known adhesive to the surface of the base (X) before application of the coating liquid (T). The coating liquid (T) may be applied to the layer (Y) formed on the base (X) in the step (Y-ii) to form the precursor layer of the layer (Z1) on the layer (Y).

The viscosity of the coating liquid (T) to be applied in the step (Z-ii) is preferably <3,000 mPa·s or less, and more preferably 2,000 mPa·s or less, as measured with a Brookfield rotational viscometer (SB-type viscometer: rotor No. 3, rotational speed=60 rpm) at a temperature at which the coating liquid (T) is applied. The viscosity of the coating liquid (S) is preferably 50 mPa·s or more, more preferably 100 mPa·s or more, and even more preferably 200 mPa·s or more. Adjusting the viscosity to 3,000 mPa·s or less improves the leveling of the coating liquid (T), thus allowing the resulting multilayer structure to have better appearance. The viscosity of the coating liquid (T) to be applied in the step (Z-ii) can be adjusted by changing the concentration and temperature of the coating liquid (T) and the time and intensity of the stirring performed after mixing in the step (Z-i-3). For example, long-time stirring following the mixing in the step (Z-i-3) may reduce the viscosity. The method for applying the coating liquid (T) onto the base (X) is not particularly limited, and any commonly-known method can be used. Examples of the application method include those which can be used to apply the coating liquid (S) in the step (Y-ii).

In the step (Z-ii), the precursor layer of the layer (Z1) is formed typically by removing the solvent from the coating liquid (T). The method for removing the solvent is not particularly limited, and any commonly-known drying method can be employed. Examples of the drying method include hot air drying, hot roll contact drying, infrared heating, and microwave heating. The drying temperature is preferably 0 to 15° C. or more lower than the onset temperature of fluidization of the base (X).

[Step (Z-iii)]

In the step (Z-iii), the precursor layer (the precursor layer of the layer (Z1)) formed in the step (Z-ii) is heat-treated at a temperature of 110° C. or higher to form the layer (Z1).

In the step (Z-iii), a reaction takes place in which particles (if the metal oxide (C) are bonded together via phosphorus atoms (phosphorus atoms derived from the phosphorus compound (D)). From another standpoint, a reaction of formation of the reaction product (E) takes place in the step (Z-iii). In order for the reaction to take place to a sufficient extent, the temperature of the heat treatment is preferably 110° C. or higher, more preferably 140° C. or higher, even more preferably 17020 C. or higher, and particularly preferably 190° C. or higher. A lowered temperature of the heat treatment increases the time required to achieve a sufficient degree of reaction, and can cause a reduction in production efficiency. The preferred upper limit of the temperature of the heat treatment depends, for example, on the type of the base (X). For example, when a thermoplastic resin film made of polyamide resin is used as the base (X), the temperature of the heat treatment is preferably 190° C. or lower. When a thermoplastic resin film made of polyester resin is used as the base (X), the temperature of the heat treatment is preferably 220° C. or lower. The heat treatment may be performed, for example, in an air atmosphere, in a nitrogen atmosphere, or in an argon atmosphere.

The length of time of the heat treatment is preferably in the range of 0.1 seconds to 1 hour, more preferably in the range of 1 second to 15 minutes, and even more preferably in the range of 5 to 300 seconds.

The method of the present invention for producing a multilayer structure may include a step of irradiating the layer (Z1) or the precursor layer of the layer (Z1) with ultraviolet light. The ultraviolet irradiation may be performed at any time after the step (Z-ii) (e.g., after the removal of the solvent from the applied coating liquid (T) is almost completed).

Treatment of a surface of the base (X) with a commonly-known anchor coating agent or application of a commonly known adhesive onto a surface of the base (X) may be performed before the application of the coating liquid (T) to dispose the adhesive layer (L) between the base (X) and the layer (Z1).

The multilayer structure thus obtained can be used per se as the multilayer structure of the present invention. As described above, another member (e.g., an additional layer) may be adhered to or formed on the multilayer structure obtained as above, and the resulting product may be used as the multilayer structure of the present invention. The adhering of the member can be done by a commonly-known method.

(Adhesive Layer (L))

In the multilayer structure of the present invention, the layer (Y) and/or layer (Z) may be stacked in direct contact with the base (X). Alternatively the layer (Y) and/or layer (Z) may be stacked on the base (X) with another layer interposed therebetween. For example, the layer (Y) and/or layer (Z) may be stacked on the base (X) with the adhesive layer (L) interposed therebetween. This configuration may achieve enhanced adhesion between the base (X) and the layer (Y) and/or layer (Z). The adhesive layer (L) may be formed from an adhesive resin. The adhesive layer (L) made of an adhesive resin can be formed by treating a surface of the base (X) with a commonly-known anchor coating agent or by applying a commonly-known adhesive to a surface of the base (X). The adhesive is preferably a two-component reactive polyurethane adhesive containing a polyisocyanate component and a polyol component, which are to be mixed and reacted. The addition of a small amount, of additive such as a commonly-known silane coupling agent to the anchor coating agent or adhesive may further enhance the resulting adhesion. Examples of the silane coupling agent include, but are not limited to, silane coupling agents having a reactive group such as an isocyanate, epoxy, amino, ureido, or mercapto group. Strong adhesion between the base (X) and the layer (Y) and/or layer (Z) via the adhesive layer (L) makes it possible to more effectively prevent deterioration in the gas barrier properties and appearance of the multilayer structure of the present invention when the multilayer structure is subjected to a process such as printing or lamination, and also makes it possible to increase the drop impact resistance of a packaging material including the multilayer structure of the present invention. The thickness of the adhesive layer (L) may be in the range of 0.01 to 10.0 μm, and may be, for example, in the range of 0.01 to 5 μm, in the range of 0.01 to 1 μm, or in the range of 0.01 to 5.0 μm.

[Additional Layer]

The multilayer structure of the present invention may include an additional layer for imparting various properties such as heat-sealing properties or for improving the barrier properties or mechanical properties. Such a multilayer structure of the present invention can be produced, for example, by stacking the layer (Y) and layer (Z) on the base (X) directly or with the adhesive layer (L) interposed therebetween and then adhering or forming the additional layer on the layer (Y) or (Z) directly or with the adhesive layer (L) interposed therebetween. Examples of the additional layer include, but are not limited to, an ink layer and a polyolefin layer. A preferred example of the multilayer structure has a structure in which at least one set of the base (X), the layer (Y), and the layer (Z) are stacked in the order of "base (X)/layer (Z)/layer (Y)".

The multilayer structure of the present invention may include an ink layer on which a product name or a decorative pattern is to be printed. Such a multilayer structure of the present invention can be produced, for example, by stacking the layer (Y) and layer (Z) on the base (X) directly or with the adhesive layer (L) interposed therebetween and then forming the ink layer directly on the layer (Y) or (Z). Examples of the ink layer include a film resulting from drying of a liquid prepared by dispersing a polyurethane resin containing a pigment (e.g., titanium dioxide) in a solvent. The ink layer may be a film resulting from drying of an ink or electronic circuit-forming resist containing a polyurethane resin free of any pigment or another resin as a main component. Methods that can be used to apply the ink layer onto the layer (Y) include gravure printing and various coating methods using a wire bar, a spin coater, or a die coater. The thickness of the ink layer is preferably in the range of 0.5 to 10.0 μm, and more preferably in the range of 1.0 to 4.0 μm.

The polymer (B) present in the layer (Y) has a hydroxy group and/or carboxyl group with high affinity to the adhesive layer (L) or additional layer (e.g., ink layer) and hence improves the adhesion between the layer (Y) and another layer.

Placing a polyolefin layer as an outermost layer of the multilayer structure of the present invention can impart heat-sealing properties to the multilayer structure or improve the mechanical characteristics of the multilayer structure. In terms of, for example, the impartation of heat-sealing properties and the improvement in mechanical characteristics, the polyolefin is preferably polypropylene or polyethylene. It is also preferable to stack at least one film selected from the group consisting of a film made of a polyester, a film made of a polyamide, and a film made of a hydroxy group-containing polymer, in order to improve the mechanical, characteristics of the multilayer structure. In terms of the improvement in mechanical, characteristics, the polyester is preferably polyethylene terephthalate, the polyamide is preferably nylon-6, and the hydroxy group-containing polymer is preferably ethylene-vinyl alcohol copolymer. Between the layers there may be an anchor coat layer or layer made of an adhesive provided as necessary.

[Configuration of Multilayer Structure]

Specific examples of the configuration of the multilayer structure of the present invention are listed below. The multilayer structure may have an adhesive layer such as the adhesive layer (L) or an additional layer; however, the adhesive layer or additional layer is omitted in the following specific examples.

(1) Layer (YZ)/polyester layer,
(2) Layer (YZ)/polyester layer/layer (YZ),
(3) Layer (YZ)/polyamide layer,
(4) Layer (YZ)/polyamide layer/layer (YZ),
(5) Layer (YZ)/polyolefin layer,
(6) Layer (YZ)/polyolefin layer/layer (YZ), (7) Layer (YZ)/hydroxy group-containing polymer layer,
(8) Layer (YZ)/hydroxy group-containing polymer layer/layer (YZ),
(9) Layer (YZ)/paper layer,
(10) Layer (YZ)/paper layer/layer (YZ),
(11) Layer (YZ)/inorganic deposited layer/polyester layer,
(12) Layer (YZ)/Inorganic deposited layer/polyamide layer,
(13) Layer (YZ)/inorganic deposited layer/polyolefin layer,
(14) Layer (YZ)/inorganic deposited layer/hydroxy group-containing polymer layer,
(15) Layer (YZ)/polyester layer/polyamide layer/polyolefin layer,
(16) Layer (YZ)/polyester layer/layer (YZ)/polyamide layer/polyolefin layer,
(17) Polyester layer/layer (YZ)/polyamide layer/polyolefin layer,
(18) Layer (YZ)/polyamide layer/polyester layer/polyolefin layer,
(19) Layer (YZ)/polyamide layer/layer (YZ)/polyester layer/polyolefin layer,
(20) Polyamide layer/layer (YZ)/polyester layer/polyolefin layer,
(21) Layer (YZ)/polyolefin layer/polyamide layer/polyolefin layer,
(22) Layer (YZ)/polyolefin layer/layer (YZ)/polyamide layer/polyolefin layer,
(23) Polyolefin layer/layer (YZ)/polyamide layer/polyolefin layer,
(24) Layer (YZ)/polyolefin layer/polyolefin layer,
(25) Layer (YZ)/polyolefin layer/layer (YZ)/polyolefin layer,
(26) Polyolefin layer/layer (YZ)/polyolefin layer,
(27) Layer (YZ)/polyester layer/polyolefin layer,
(28) Layer (YZ)/polyester layer/layer (YZ)/polyolefin layer,
(29) Polyester layer/layer (YZ)/polyolefin layer,
(30) Layer (YZ)/polyamide layer/polyolefin layer,
(31) Layer (YZ)/polyamide layer/layer (YZ)/polyolefin layer,
(32) Polyamide layer/layer (YZ)/polyolefin layer,
(33) Layer (YZ)/polyester layer/paper layer,
(34) Layer (YZ)/polyamide layer/paper layer,
(35) Layer (YZ)/polyolefin layer/paper layer,
(36) Polyolefin layer/paper layer/polyolefin layer/layer (YZ)/polyester layer/polyolefin layer,
(37) Polyolefin layer/paper layer/polyolefin layer/layer (YZ)/polyamide layer/polyolefin layer.
(38) Polyolefin layer/paper layer/polyolefin layer/layer (YZ)/polyolefin layer,
(39) Paper layer/polyolefin layer/layer (YZ)/polyester layer/polyolefin layer,
(40) Polyolefin layer/paper layer/layer (YZ)/polyolefin layer,
(41) Paper layer/layer (YZ)/polyester layer/polyolefin layer,
(42) Paper layer/layer (YZ)/polyolefin layer,
(43) Layer (YZ)/paper layer/polyolefin layer,
(43) Layer (YZ)/polyester layer/paper layer/polyolefin layer,
(45) Polyolefin layer/paper layer/polyolefin layer/layer (YZ)polyolefin layer/hydroxy group-containing polymer layer,
(46) Polyolefin layer/paper layer/polyolefin layer/layer (YZ)polyolefin layer/polyamide layer,
(47) Polyolefin layer/paper layer/polyolefin layer/layer (YZ)polyolefin layer/polyester layer,
(48) Inorganic deposited layer/layer (YZ)/polyester layer,
(49) Inorganic deposited layer/layer (YZ)/polyester layer/layer (YZ)/inorganic deposited layer,
(50) Inorganic deposited layer/layer (YZ)/polyamide layer,
(51) Inorganic deposited layer/layer (YZ)/polyamide layer/layer (YZ)/inorganic deposited layer.
(52) Inorganic deposited layer/layer (YZ)/polyolefin layer,
(53) Inorganic deposited layer/layer (YZ)/polyolefin layer/layer (YZ)/inorganic deposited layer, According to the present invention, it is possible to obtain a multilayer structure that has an oxygen transmission rate of 2 mL(m²#day·atm) or less at 20°C. and 85% RH. It is also possible to obtain a multilayer structure that has a moisture permeability of 1.0 g/(m²·day) or less at 40° C. and 90% RH. The methods and conditions for measurement of the oxygen transmission rate and moisture permeability are as described later in "EXAMPLES".

[Container]

The container of the present invention is a container including the multilayer label of the present invention laminated thereon. From another standpoint, the container of the present invention is a container that is formed by in-mold labeling and that includes the multilayer label of the present invention. Typically, the container of the present invention includes a container body and the multilayer label of the present invention which is disposed on the surface of the container body. The container body is formed through injection of a molten resin into a mold. The shape of the container body is not particularly limited, and may be a cup shape or a bottle shape, for example.

An example of the method for producing the container according to the present invention includes: a first step of placing a multilayer label of the present invention in a cavity between a female mold member and a male mold member; and a second step of injecting a molten resin into the cavity to perform molding of a container body and lamination of the multilayer label of the present invention to the container body simultaneously. Each step can be carried out in the same manner as in commonly-known methods, except for using the multilayer label of the present invention.

A cross-sectional view of an example of the container of the present invention is shown in FIG. 1. A container 10 includes a cup-shaped container body 20 and multilayer labels 31 to 33 laminated to the surface of the container body 20. The multilayer labels 31 to 33 are each, the multilayer label of the present invention. The container body 20 includes a body portion 21, a bottom portion 22, and a flange portion 23. The flange portion 23 has at its edges projections 23a extending upwardly and downwardly. The multilayer label 31 is disposed to cover the outer surface of the bottom portion 22. At the center of the multilayer label 31 there is formed a through hole 31a for injecting a resin in the in-mold labeling. The multilayer label 32 is disposed to cover the outer surface of the body portion 21 and the under surface or the flange portion 23. The multilayer label 38 is disposed to cover a pan of the inner surface of the body portion 21 and the top surface of the flange portion 23. The multilayer labels 31 to 33 are fused with the container body 20 and united with the container body 20 by in-mold labeling. As shown in FIG. 1, the edge surfaces of the multilayer label 33 are fused with the container body 20 and are not exposed to the outside.

In the container 10, the body portion 21, the bottom portion 22, and the flange portion 23 of the container body 20 are covered by the multilayer labels 31 to 33 of the present invention. The container 10 thus has good gas barrier properties. In addition, since the edge surfaces of the multilayer label 33 are fused with the container body 20, the substance contained in the container 10 is prevented from being contaminated by the material of the multilayer label 33.

In in-mold labeling, at least one multilayer label of the present invention is placed in a mold. One or a plurality of multilayer labels of the present invention may be placed on the inner wall surface of a female mold member, on the outer wall surface of a male mold member, or on both the inner and outer wall surfaces. In a preferred example, the multilayer label of the present invention is attached over the entire inner wall surface of the female mold member. Thereby, the entire exterior of the container can be covered with the multilayer label of the present invention.

Figure 2A:
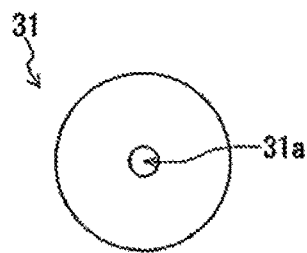
FIG. 2A, FIG. 2B, and FIG. 2C are each a plan view schematically showing an example of a multilayer label used in the container shown in FIG. 1.
Figure 2B:
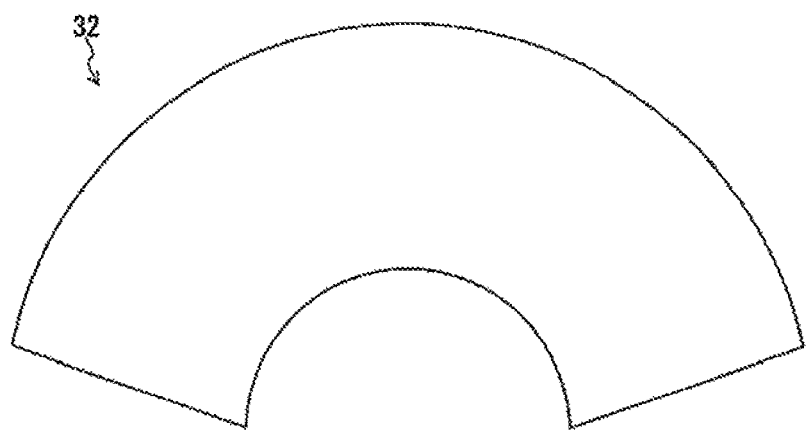
Figure 2C:
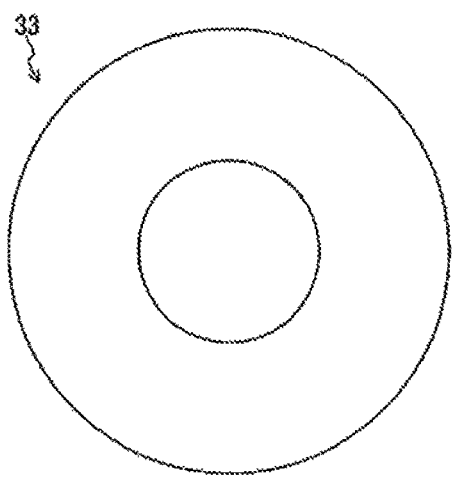

The plan views of the multilayer labels 31, 32, and 33 used in the production of the container 10 are schematically shown in FIG. 2A, FIG. 2B, and FIG. 2C respectively. The multilayer label 31 has a circular shape and includes a through hole 31a formed at the center thereof. The multilayer label 32 has a fan-like shape. The multilayer label 33 has a ring shape.

The container 10 is produced by in-mold labeling. In in-mold labeling, molding of the container body 20 and labeling onto the container body 20 are performed simultaneously. An example of the method for producing the container 10 by in-mold labeling will now be described. In this method, a mold consisting of a male mold member and a female mold member is used. First, the multilayer labels 31 to 33 each having a predetermined shape are placed at predetermined positions on the inner wall of the female mold member and the outer wall of the male mold member. The multilayer labels 31 to 33 are fixed to the mold, for example, by suction via through holes provided in the mold. Next, the male mold member is pressed into the female mold member to form a cavity therebetween, and a resin as the material of the container body 20 is melted and injected into the cavity. By this injection molding, molding of the container body 20 and labeling onto the container body 20 are performed simultaneously.

The molten resin (the resin constituting the container body 20) to be injected into the cavity is not particularly limited, and any resin commonly used in in-mold labeling may be used. Examples of the molten resin include polypropylene, polyethylene, polystyrene, and polyethylene terephthalate. Preferably, the molten resin is the same as the resin present on one of surfaces of the multilayer label that is to be attached to the container body (an inward surface of the multilayer label). When the molten resin is the same as the resin present on the inward, surface of the multilayer label, good adhesion is achieved between the multilayer label and the container body and thus the resulting in-mold labeled container has good appearance. The temperature at which the rosin to be melted is melted can be determined as appropriate depending on the melting point of the resin used, and it may be, for example, in the range of 120 to 330° C. (in an example, in the range of 150 to 300° C.).

EXAMPLES

Hereinafter, the present invention will be described in more detail by way of examples. The present invention is not limited by these examples in any respect, and it should be understood that many modifications can be made by any ordinarily skilled person in the art within the technical concept of the present invention. Analysis and evaluation in Examples and Comparative Examples given below were performed as will now be described.

(1) Measurement of Infrared Absorption Spectrum

The measurement was performed by attenuated total reflection spectroscopy using a Fourier transform infrared spectrophotometer. The measurement conditions were as follows.

Apparatus: Spectrum One, manufactured by PerkinElmer. Inc.

Measurement mode: Attenuated total reflection spectroscopy

Measurement range: 800 to 1,400 $cm^{-1}$ (2) Measurement of Respective Thicknesses of Layers Each multilayer structure was cut using a focused ion beam (FIB) to prepare a section (thickness: 0.3 μm) for cross-sectional observation. The prepared section was secured to a sample stage with a carbon tape and subjected to platinum ion sputtering at an accelerating voltage of 30 kV for 30 seconds. The cross-section of the multilayer structure was observed using a field-emission transmission electron microscope to determine the respective thicknesses of the layers. The measurement conditions were as follows.

Apparatus: JEM-2100F, manufactured by JEOL Ltd.

Accelerating voltage: 200 kV

Magnification: ×250,000

(3) Measurement of Oxygen Transmission Rate of Multilayer Label

Each multilayer label was set to an oxygen transmission rate measurement apparatus in such a manner that the layer as the base fated the carrier gas side, and the oxygen transmission rate was measured. The measurement conditions were as follows.

Apparatus: MOCON OX-TRAN 2/20, manufactured by ModernControls, Inc.

Temperature: 20° C.

Humidity on oxygen feed side: 85% RH

Humidity on carrier gas side: 85% RH

Oxygen pressure: 1 atmosphere

Carrier gas pressure: 1 atmosphere (4) Measurement of Oxygen Transmission Rate of Multilayer Label After Stretching First, a measurement sample with a size of 15 cm×10 cm was cut out from each multilayer structure. This sample was left at 23° C. and 50% RH for 24 hours, after which, under the same conditions, the sample was longitudinally stretched by 3% and allowed to keep the stretched state for 10 seconds. The oxygen transmission rate of the sample having undergone stretching was measured by the method described in (3) above.

(5) Measurement of Moisture Permeability of Multilayer Label

Each-multilayer label was set to a water vapor transmission rate measurement apparatus in such a manner that the layer as the base faced the carrier gas side, and the moisture permeability (water vapor transmission rate) was measured. The measurement conditions were as follows.

Apparatus: MOCON PERMATRAN 3/33, manufactured by ModernControls, Inc.

Temperature: 40° C.

Humidity on water vapor feed side: 90% RH

Humidity on carrier gas side: 0% RH (6) Measurement of Moisture Permeability of Multilayer Label After Stretching First, a measurement sample with a size of 15 cm×10 cm was cut out from each multilayer structure. This sample was left at 23° C. and 50% RH for 24 hours, after which, under the same conditions, the sample was longitudinally stretched by and allowed to keep the stretched state for 10 seconds. The moisture permeability (water vapor transmission rate) of the sample having undergone stretching was measured by the method described in (5) above.

<Production Example of Coating Liquid (T)>

Distilled water in an amount of 230 parts by mass was heated to 70° C. under stirring. Aluminum isopropoxide in an amount of 88 parts by mass was added dropwise to the distilled water over 1 hour, the liquid temperature was gradually increased to 95° C., and isopropanol generated was distilled off. In this manner, hydrolytic condensation was performed. To the resulting liquid was added 4.0 parts by mass of a 60 mass % aqueous nitric acid solution, and this was followed by stirring at 95° C. for 3 hours to deflocculate agglomerates of particles of the hydrolytic condensate. After that, the liquid was concentrated so that it had a solids concentration of 10 mass % in terms of aluminum oxide. To 18.66 parts by mass of the thus obtained dispersion were added 58.19 parts by mass of distilled water, 19.00 parts by mass of methanol, and 0.50 parts by mass of a 5 mass % aqueous polyvinyl alcohol solution. This was followed by stirring to obtain a homogeneous dispersion. Subsequently, 3.66 parts by mass of an 85 mass % aqueous phosphoric acid solution was added dropwise to the dispersion under stirring, with the liquid temperature held at 15° C. The stirring was continued at 15° C. until a viscosity of 1,500 mPa·s was reached, and the intended coating liquid (T-1) was thus obtained. In the coating liquid (T-1), the molar ratio between aluminum atoms and phosphorus atoms, as expressed by aluminum atoms:phosphorus atoms, was 1.15:1.00.

<Synthesis Example of Polymer (Aa-1)>

Under nitrogen atmosphere, 8.5 g of 2-phosphonooxyethyl methacrylate and 0.1 g of azobisisobutyronitrile were dissolved in 17 g of methyl ethyl ketone, and the resulting solution was stirred at 80° C. for 12 hours. The polymer solution obtained was cooled and then added to 170 g of 1,2-dichloroethane. This was followed by decantation to collect the polymer formed as a precipitate. Subsequently the polymer was dissolved in tetrahydrofuran, and the solution was subjected to purification by reprecipitation using 1,2-dichloroethane as a poor solvent. The purification by reprecipitation was repeated three times, followed by vacuum drying at 50° C. for 24 hours to obtain a polymer (Aa-1). The polymer (Aa-1) was a polymer of 2-phosphonooxyethyl methacrylate. As a result of GPC analysis, the number average molecular weight of the polymer was determined to be 10,000 a polystyrene-equivalent basis.

<Synthesis Example of Polymer (Aa-2)>

A polymer (Aa-2) was obtained in the same manner in the synthesis example of the polymer (Aa-1), except for using a mixture of 2-phosphonooxyethyl methacrylate and acrylonitrile (at a molar ratio, 2-phosphonooxyethyl methacrylate:acrylonitrile, of 2:1) instead of using 2-phosphonooxyethyl methacrylate alone. The polymer (Aa-2) was a copolymer of 2-phosphonooxyethyl methacrylate and acrylonitrile. As a result of GPC analysis, the number average molecular weight of the polymer was determined to be 10,000 on a polystyrene-equivalent basis.

<Synthesis Example of Polymer (Aa-3)>

Under nitrogen atmosphere, 10 g of vinylphosphonic acid and 0.025 g of 2,2'-azobis(2-amidinopropane) dihydrochloride were dissolved in 5 g of water, and the resulting solution was stirred at 80° C. for 3 hours. After being cooled, the polymer solution was diluted by the addition of 15 g of water and then filtered using "Spectra/Por" (registered trademark), a cellulose membrane manufactured by Spectrum Laboratories, Inc. Water was removed from the filtrate by distillation, followed by vacuum drying at 50° C. for 24 hours to obtain a polymer (Aa-3). The polymer (Aa-3) was poly (vinylphosphonic acid). As a result of GPC analysis, the number average molecular weight of the polymer was determined to be 10,000 on a polyethylene glycol-equivalent basis.

<Production Example of Coating Liquid (S-1)>

The polymer (Aa-1) obtained in the above synthesis example was dissolved in a mixed solvent of water and methanol (at a mass ratio, water:methanol of 7:3) to obtain a coating liquid having a solids concentration of 1 mass %.

<Production Examples of Coating Liquids (S-2) and (S-3)>

Coating liquids (S-2) and (S-3) were produced in the same manner as in the production of the coating liquid (S-1), except for using the polymer (Aa-2) and the polymer (Aa-3) instead of the polymer (Aa-1).

<Production Example of Coating Liquid (S-4)>

A mixture containing 91 mass % of the polymer (Aa-3) obtained in the above synthesis example and 9 mass % of polyvinyl alcohol (PVA 124, manufactured by KURARAY CO., LTD.) was prepared. This mixture was dissolved in a mixed solvent of water and methanol (at a mass ratio, water:methanol, of 7:3) to obtain a coating liquid (S-4) having a solids concentration of 1 mass %.

<Production Examples of Coating Liquids (S-5) to (S-9)>

Coating liquids (S-5) to (S-9) were produced in the same manner as in the production of the coating liquid (S-4), except for varying the type of the polymer (B) and the mass ratio between the polymer (Aa-3) and polymer (B).

The details of films used in Examples and Comparative Examples were as follows.

1) PET 12: Oriented polyethylene terephthalate film; "Lumirror P60" (trade name), manufactured by Toray Industries, Inc. and having a thickness of 12 μm (2) CPP 100: Non-oriented polypropylene film; "RXC-21" (trade name), manufactured by Mitsui Chemicals Tohcello, Inc. and having a thickness of 100 μm 3) ONY: Oriented nylon film; "EMBLEM ONBC" (trade name), manufactured by UNITIKA LTD. and having a thickness of 15 μm Example 1

Multilayer Label

Example 1-1

First, a PET 12 was prepared as the base (X). The coating liquid (T-1) was applied onto this base using a bar coater in such a manner that the dry thickness would be 0.3 μm. The applied film was dried at 110° C. for 5 minutes and then heat-treated at 160° C. for 1 minute to form the layer (Z1) on the base. A structure having a configuration of "base (X)/layer (Z1)" was thus obtained. As a result of measurement of the infrared absorption spectrum of the obtained structure, the maximum absorption wavenumber in the region of 800 to 1,400 $cm^{-1}$ was determined to be 1,108 $cm^{-1}$, and the half width of the maximum absorption band was determined to be 37 $cm^{-1}$. Subsequently, the coating liquid (S-1) was applied onto the structure using a bar coater in such a manner that the dry thickness would be 0.05 µm, and then was dried at 220° C. for 1 minute to form the layer (Y). A multilayer structure (1-1) having a configuration of "base (X)/layer (Z1)/layer (Y)" was thus obtained.

Subsequently a two-component adhesive was applied to each of two CPP 100 s using a bar coater in such a manner that the dry thickness would be 3 µm and then dried. The two-component adhesive used was an adhesive composed of "A-525S" of "TAKELAC" (registered trademark) manufactured by Mitsui Chemicals, Inc. and "A-50" of "TAKENATE" (registered trademark) manufactured by Mitsui Chemicals, Inc. Next, the two CPPs were laminated to the multilayer structure (1-1), and the resulting laminate was allowed to stand at 40° C. for 5 days for aging, In this way a multilayer label (1) having a configuration of "CPP/adhesive layer (L)/base (X)/layer (Z1)/layer (Y)/adhesive layer (L)/CPP" was obtained.

The oxygen transmission rate and moisture permeability of the multilayer label (1) obtained were measured by the methods described above. The oxygen transmission rate and moisture permeability of the multilayer label (1) having undergone stretching were measured by the methods described above.

Examples 1-2 to 1-9

Multilayer structures (1-2) to (1-9) and multilayer labels (2) to (9) of Examples 1-2 to 1-9 were fabricated in the same manner as in the fabrication of the multilayer label (1) of Example 1-1, except for substituting the coating liquids (S-2) to (S-9) for the coating liquid (S-1).

Examples 1-10 and 1-11

Multilayer structures were fabricated in the same manner as in the fabrication of the multilayer structure (1-1) of Example 1-1, except for using a deposited layer formed by vacuum deposition instead of the layer (Z1) of Example 1-1. In Example 1-10, a multilayer structure (1-10) was fabricated by forming a layer (Z2) of aluminum with a thickness of 0.03 µm by vacuum deposition. In Example 1-11, a multilayer structure (1-11) was fabricated by forming a layer (Z3) of aluminum oxide with a thickness of 0.03 µm by vacuum deposition. Multilayer labels (10) and (31) were fabricated in the same manner as in the fabrication of the multilayer label (1) of Example 1-1, except for substituting the multilayer structure (1-10) and the multilayer structure (1-11) for the multilayer structure (1-1).

Example 1-12

First, the layer (Z3) of aluminum oxide with a thickness of 0.03 µm was formed on the base-(X) by vacuum deposition. Next, the layer (Z1) with a thickness of 0.3 µm was formed on the layer (Z3) using the coating liquid (T-1) in the same manner as in Example 1-1. Subsequently, the layer (Y) was formed on the layer (Z1) using the coating liquid (S-1) in the same manner as in Example 1-1. In this way, a multilayer structure (1-12) having a configuration of "base (X)/layer (Z3)/layer (Z1)/layer (Y)" was fabricated. In addition, a multilayer label (12) was fabricated in the same manner as in the fabrication of the multilayer label (1) of Example 1-1, except for substituting the multilayer structure (1-12) for the multilayer structure (1-1).

Example 1-13

First, the layer (Z1) with a thickness of 0.3 µm was formed on the base (X) using the coating liquid (T-1) in the same manner as in Example 1-1. Next, the layer (Z3) of aluminum oxide with, a thickness of 0.03 µm was formed on the layer (Z1) by vacuum deposition in the same manner as in Example 1-10. Subsequently, the layer (Y) was formed on the layer (Z3) using the coating liquid (S-1) in the same manner as in Example 1-1. In this way, a multilayer structure (1-13) having a configuration of "base (X)/layer (Z1)/layer (Z3)/layer (Y)" was fabricated. In addition, a multilayer label (13) was fabricated in the same manner as in the fabrication of the multilayer label (1) of Example 1-1, except for substituting the multilayer structure (1-13) for the multilayer structure (1-1).

Example 1-14

An ink layer was formed by applying an ink to the layer (Y) of the multilayer structure (1-1) obtained in Example 1-1 using a bar coater in such a manner that the dry thickness would be 2 µm and then drying the applied ink. Next, an adhesive layer (L) was formed on this ink layer by applying the same two-component adhesive as that used in Example 1-1 in such a manner that the dry thickness would be 3 µm, and then on ONY was adhered to the ink layer via the adhesive layer (L) thus formed. Furthermore, an adhesive layer (L) was formed on this ONY by applying the same two-component adhesive as that used in Example 1-1 in such a manner that the dry thickness would be 3 µm, and then the same CPP as that used in Example 1-1 was adhered to the ONY via the adhesive layer (L) thus formed. In this way, a multilayer label (14) having a layer configuration of "base (X)/layer (Z1)/layer (Y1)/ink layer/adhesive layer (L)/ONY/adhesive layer (L)/CPP" was obtained. The ink used was "R641 AT White" of "Fine Star" (registered trademark) manufactured by TOYO INK CO., LTD.

Comparative Examples 1-1 to 1-3

In Comparative Example 1-1, a multilayer structure (C1-1) was fabricated in the same manner as in the fabrication of the multilayer structure (1-1) of Example 1-1, except that a layer (Y1) was not formed. In Comparative Example 1-2, a multilayer structure (C1-2) was fabricated in the same manner as in the fabrication of the multilayer structure (1-10) of Example 1-10, except that a layer (Y1) was not formed. In Comparative Example 1-3, a multilayer structure (C2-3) was fabricated in the same manner as in the fabrication of the multilayer structure (1-11) of Example 1-11, except that a layer (Y1) was not formed. In addition, multilayer labels (C1) to (C3) were fabricated in the same manner as in the fabrication of the multilayer label (1) of Example 1-1 except for substituting the multilayer structures (C1-1) to (C1-3) for the multilayer structure (1-1).

Comparative Example 1-4

In Comparative Example 1-4, a multilayer structure (C1-4) was fabricated in the same manner as in the fabrication of the multilayer structure (1-11) of Example 1-11 except that a layer (Z4) of silicon oxide with a thickness of 0.03 µm was formed by vacuum deposition instead of the layer (Z3) of Example 1-11. In addition, a multilayer label (C4) was fabricated in the same manner as in the lubrication of the multilayer label (1) of Example 1-1 except for substituting the multilayer structures (C1-4) tor the multilayer structure (1-1).

The conditions of product ion of the multilayer structures of Examples and Comparative Examples are shown in Table 1.

TABLE 1

| | Multilayer structure | | Layer (Y) | | | |
|---|---|---|---|---|---|---|
| | | | Coating liquid (S) No. | Composition of coating liquid (S) | | A:B (mass ratio) |
| | No. | Layer configuration | | Polymer (A) | Polymer (B) | |
| Example I-1 | I-1 | (X)/(Z1)/(Y) | S-1 | Aa-1 | — | — |
| Example I-2 | I-2 | (X)/(Z1)/(Y) | S-2 | Aa-2 | — | — |
| Example I-3 | I-3 | (X)/(Z1)/(Y) | S-3 | Aa-3 | — | — |
| Example I-4 | I-4 | (X)/(Z1)/(Y) | S-4 | Aa-3 | PVA 124 | 91:9 |
| Example I-5 | I-5 | (X)/(Z1)/(Y) | S-5 | Aa-3 | PVA 124 | 65:35 |
| Example I-6 | I-6 | (X)/(Z1)/(Y) | S-6 | Aa-3 | PVA 424H | 65:35 |
| Example I-7 | I-7 | (X)/(Z1)/(Y) | S-7 | Aa-3 | RS-2117 | 91:9 |
| Example I-8 | I-8 | (X)/(Z1)/(Y) | S-8 | Aa-3 | PAA | 91:9 |
| Example I-9 | I-9 | (X)/(Z1)/(Y) | S-9 | Aa-3 | Starch | 91:9 |
| Example I-10 | I-10 | (X)/(Z2)/(Y) | S-1 | Aa-1 | — | — |
| Example I-11 | I-11 | (X)/(Z3)/(Y) | S-1 | Aa-1 | — | — |
| Example I-12 | I-12 | (X)/(Z3)/(Z1)/(Y) | S-1 | Aa-1 | — | — |
| Example I-13 | I-13 | (X)/(Z1)/(Z3)/(Y) | S-1 | Aa-1 | — | — |
| Example I-14 | I-1 | (X)/(Z1)/(Y) | S-1 | Aa-1 | — | — |
| Comparative Example I-1 | CI-1 | (X)/(Z1) | — | — | — | — |
| Comparative Example I-2 | CI-2 | (X)/(Z2) | — | — | — | — |
| Comparative Example I-3 | CI-3 | (X)/(Z3) | — | — | — | — |
| Comparative Example I-4 | CI-4 | (X)/(Z4)/(Y) | S-1 | Aa-1 | — | — |

In Table 1, "A:B" refers to "polymer (A):polymer (B)". The polymers (B) listed hi Table 1 are the following substances.

PVA124: Polyvinyl alcohol (KURARAY POVAL (registered Trademark) manufactured by KURARAY CO., LTD., degree of saponification=98.5 mol %, viscosity-average degree of polymerization=2,400, viscosity of 4 mass % aqueous solution at 20° C.=60 mPa·s)

PVA424H: Polyvinyl alcohol (KURARAY POVAL (registered trademark) manufactured by KURARAY CO., LTD., degree of saponification=79.5 mol %, viscosity-average degree of polymerization=2,400, and viscosity of 4 mass % aqueous solution at 20° C.=48 mPa·s)

RS-2117: Hydroxy group-containing water-soluble polymer (EXCEVAL (registered trademark) manufactured by KURARAY CO., LTD., degree of saponification=98.2 mol %, viscosity-average degree of polymerization=1,700, viscosity of 4 mass % aqueous solution at 20° C.=26.5 mPa·s, degree of ethylene modification=3.0 mol %)

PAA: Polyacrylic acid (Aron-15H (registered trademark) manufactured by TOAGOSEI CO., LTD., number average molecular weight=210,000, weight average molecular weight=1,290,000)

Starch: Starch manufactured by Wako Pure Chemical Industries, Ltd. (being soluble and having purity of Wako 1st Grade)

The multilayer Labels (2) to (14) of Examples 1-2 to 1-14 and the multilayer labels (C1) to (C4) of Comparative Examples 1-1 to 1-4 were evaluated in the same manner as for the multilayer label (1) of Example 1-1. The configurations of the multilayer labels (1) to (14) and (C1 to C4) and the results of the evaluation thereof are shown in Table 2.

TABLE 2

| | | | Multilayer label | | | |
|---|---|---|---|---|---|---|
| | | | Oxygen transmission rate mL/(m² · day · atm) | | Moisture permeability g/(m² · day) | |
| | No. | Layer configuration | Before stretching | After stretching | Before stretching | After stretching |
| Example I-1 | 1 | CPP/(L)/(X)/(Z1)/(Y)/(L)/CPP | 0.2 | 0.8 | 0.2 | 0.4 |
| Example I-2 | 2 | CPP/(L)/(X)/(Z1)/(Y)/(L)/CPP | 0.2 | 2.2 | 0.2 | 0.6 |
| Example I-3 | 3 | CPP/(L)/(X)/(Z1)/(Y)/(L)/CPP | 0.2 | 0.5 | 0.2 | 0.5 |
| Example I-4 | 4 | CPP/(L)/(X)/(Z1)/(Y)/(L)/CPP | 0.2 | 0.6 | 0.2 | 0.4 |
| Example I-5 | 5 | CPP/(L)/(X)/(Z1)/(Y)/(L)/CPP | 0.2 | 0.5 | 0.2 | 0.5 |
| Example I-6 | 6 | CPP/(L)/(X)/(Z1)/(Y)/(L)/CPP | 0.2 | 0.8 | 0.2 | 0.6 |
| Example I-7 | 7 | CPP/(L)/(X)/(Z1)/(Y)/(L)/CPP | 0.2 | 1.5 | 0.2 | 0.4 |
| Example I-8 | 8 | CPP/(L)/(X)/(Z1)/(Y)/(L)/CPP | 0.2 | 2.0 | 0.2 | 0.6 |
| Example I-9 | 9 | CPP/(L)/(X)/(Z1)/(Y)/(L)/CPP | 0.2 | 1.3 | 0.2 | 0.5 |

TABLE 2-continued

| | | | Multilayer label | | | |
|---|---|---|---|---|---|---|
| | | | Oxygen transmission rate mL/(m² · day · atm) | | Moisture permeability g/(m² · day) | |
| | No. | Layer configuration | Before stretching | After stretching | Before stretching | After stretching |
| Example I-10 | 10 | CPP/(L)/(X)/(Z2)/(Y)/(L)/CPP | 1.8 | 2.3 | 0.3 | 1.0 |
| Example I-11 | 11 | CPP/(L)/(X)/(Z3)/(Y)/(L)/CPP | 0.8 | 2.4 | 0.3 | 0.9 |
| Example I-12 | 12 | CPP/(L)/(X)/(Z3)/(Z1)/(Y)/(L)/CPP | 0.2 | 1.0 | 0.2 | 0.4 |
| Example I-13 | 13 | CPP/(L)/(X)/(Z1)/(Z3)/(Y)/(L)/CPP | 0.2 | 1.0 | 0.2 | 0.4 |
| Example I-14 | 14 | (X)/(Z1)/(Y)/Ink layer/(L)/ONY/(L)/CPP | 0.2 | 0.8 | 0.2 | 0.4 |
| Comparative Example I-1 | C1 | CPP/(L)/(X)/(Z1)(L)/CPP | 0.2 | 40.0 | 0.2 | 1.2 |
| Comparative Example I-2 | C2 | CPP/(L)/(X)/(Z2)(L)/CPP | 1.8 | 50.0 | 0.3 | 1.5 |
| Comparative Example I-3 | C3 | CPP/(L)/(X)/(Z3)/(L)/CPP | 0.8 | 50.0 | 0.3 | 1.4 |
| Comparative Example I-4 | C4 | CPP/(L)/(X)/(Z4)/(Y)/(L)/CPP | 0.9 | 50.0 | 0.3 | 1.4 |

As shown in Table 2 above, the multilayer labels of the present invention had good gas barrier properties and maintained the gas barrier properties at a high level even when exposed to a strong stretching stress.

Example 2

Container

Example 2-1

The multilayer label (1) obtained in Example 1-1 was cut to fit the inner wall surface of a female mold member of a container-forming mold, and attached to the inner wall surface of the female mold member. A male mold member was then pressed into the female mold member. Next, molten polypropylene ("EA7A" of "NOVATEC" (registered trademark), manufactured by Japan Polypropylene Corporation) was injected into the cavity formed between the male mold member and the female mold member at 220° C. The injection molding was carried out in this way to form the intended container (2-1). The container body had a thickness of 700 μm and a surface area of 83 cm². The entire exterior of the container was covered with the multilayer label (1); that is the multilayer label (1) overlapped the seam so that the exterior of the container was free of any area that was not covered with the multilayer label (1). The multilayer label showed no interlayer delamination, and the container (2-1) had good appearance.

Examples 2-2 to 2-14 and Comparative Examples 2-1 to 2-4

Containers (2-2) to (2-14) and containers (C2-1) to (C2-4) were fabricated in the same manner as in the fabrication of the container (2-1) of Example 2-1, except for using the multilayer labels (2) to (14) and (C1) to (C4) instead of the multilayer label (2) obtained in Example 1-1. In the containers obtained in Examples 2-2 to 2-14, the multilayer labels showed no interlayer delamination as in Example 2-1, and the containers bad good appearance. By contrast, in the containers obtained in Comparative Examples, the multilayer labels showed interlayer delamination.

INDUSTRIAL APPLICABILITY

The multilayer label of the present invention has good gas barrier properties and is capable of maintaining the gas barrier properties at a high level even when exposed to physical stresses such as deformation and impact. The multilayer label of the present invention is resistant to appearance defects such as interlayer delamination even after being exposed to heating during in-mold labeling.

DESCRIPTION OF REFERENCE NUMERALS

10 Container
20 Container body
21 Body portion
22 Bottom portion
23 Flange portion
23*a* Projection
31, 32, 33 Multilayer label
31*a* Through hole

The invention claimed is:
1. A multilayer label for in-mold labeling, comprising:
a base (X);
a layer (Z) containing an aluminum atom; and
a layer (Y) containing a polymer (A) having a functional group containing a phosphorus atom,
wherein
the polymer (A) is a polymer (Aa) having at least one functional group selected from the group consisting of a phosphoric acid group, a phosphorous acid group, a phosphonic acid group, a phosphonous acid group, a phosphinic acid group and a phosphinous acid group, and
the base (X) comprises a thermoplastic resin film layer.
2. The multilayer label according to claim 1, comprising at least one pair of the layer (Z) and the layer (Y) that are disposed contiguous to each other.
3. The multilayer label according to claim 1, wherein:
the layer (Z) comprises a layer (Z1) containing a reaction product (E);
the reaction product (E) is a reaction product formed by a reaction between a metal oxide (C) containing an aluminum atom and a phosphorus compound (D); and in an infrared absorption spectrum of the layer (Z1), a maximum absorption wavenumber in a region of 800 to 1,400 cm$^{-1}$ is 1,080 to 1,130 cm$^{-1}$.

4. The multilayer label according to claim 1, wherein the layer (Z) comprises a deposited layer (Z2) of aluminum or a deposited layer (Z3) of aluminum oxide.

5. The multilayer label according to claim 1, wherein the polymer (A) is a polymer (Aa) having at least one functional group selected from the group consisting of a phosphoric acid group and a phosphoric acid group.

6. The multilayer label according to claim 1, having an oxygen transmission rate of 2 mL(m$^2$·day·atm) or less at 20° C. and 85% RH.

7. A container comprising the multilayer label according to claim 1 laminated thereon.

8. A method for producing a container, comprising:
placing the multilayer label according to claim 1 in a cavity between a female mold member and a male mold member; and
injecting a molten resin into the cavity to perform molding of a container body and lamination of the multilayer label to the container body simultaneously.

* * * * *